United States Patent
Ide

(10) Patent No.: US 8,355,479 B2
(45) Date of Patent: Jan. 15, 2013

(54) SIGNAL PROCESSING APPARATUS AND SIGNAL PROCESSING METHOD

(75) Inventor: Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 12/698,508

(22) Filed: Feb. 2, 2010

(65) Prior Publication Data

US 2010/0202579 A1    Aug. 12, 2010

(30) Foreign Application Priority Data

Feb. 9, 2009    (JP) ................ P2009-027768

(51) Int. Cl.
    *H04L 7/00*    (2006.01)
(52) U.S. Cl. .................... 375/355; 375/354; 714/12
(58) Field of Classification Search .................... 375/355
    See application file for complete search history.

(56) References Cited

U.S. PATENT DOCUMENTS

| | | | |
|---|---|---|---|
| 6,334,219 B1 * | 12/2001 | Hill et al. ............... | 725/106 |
| 6,477,208 B1 * | 11/2002 | Huff ........................ | 375/265 |
| 7,535,822 B2 * | 5/2009 | Geile et al. ................ | 370/208 |
| 2001/0050926 A1 * | 12/2001 | Kumar ..................... | 370/529 |
| 2007/0160164 A1 * | 7/2007 | Sahota ..................... | 375/295 |
| 2008/0043704 A1 * | 2/2008 | Geile ....................... | 370/342 |
| 2010/0040171 A1 * | 2/2010 | Qu et al. .................. | 375/298 |

FOREIGN PATENT DOCUMENTS

JP    2008-294730    12/2008

* cited by examiner

*Primary Examiner* — Erin File
(74) *Attorney, Agent, or Firm* — Finnegan, Henderson, Farabow, Garrett & Dunner, L.L.P.

(57) ABSTRACT

There is provided a signal processing apparatus includes a sampling clock generator for generating a sampling clock by delaying, a phase of a driving clock having the same frequency as a carrier-wave; a logic data generator for generating logic data in synchronization with the driving clock, that the logic data are generated by using the driving clock generated to sample a modulation signal obtained by shifting a phase of the carrier-wave; a sampling bit-string generator for generating a sampling bit-string by shifting the logic data; a phase-error data generator for using a bit-string corresponding to one cycle of the carrier-wave extracted from the sampling bit-string to generate phase-error data between a phase of the bit-string and the phase of the carrier-wave; and an extraction position determination unit for determining, based on the phase-error data, an extraction position of the bit-string having a phase similar that of the carrier-wave.

7 Claims, 13 Drawing Sheets

204: SAMPLING BIT STRING GENERATION UNIT

FIG.7
204: SAMPLING BIT STRING GENERATION UNIT
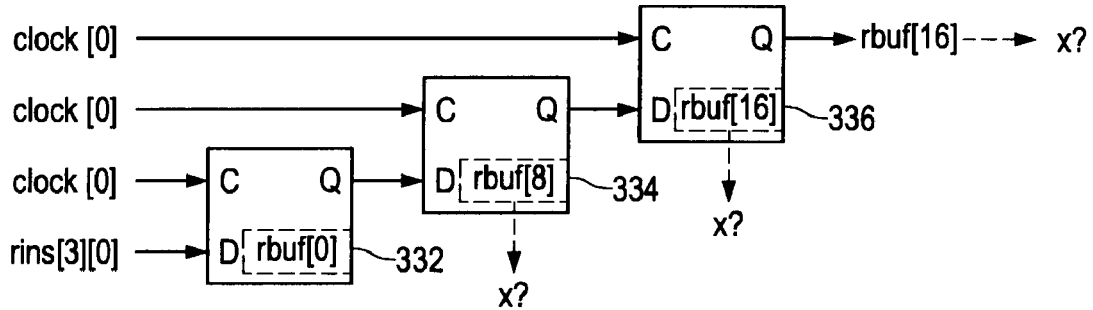
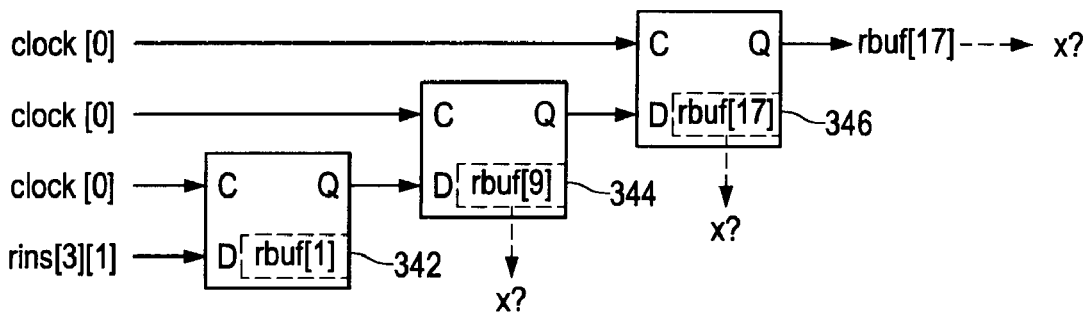
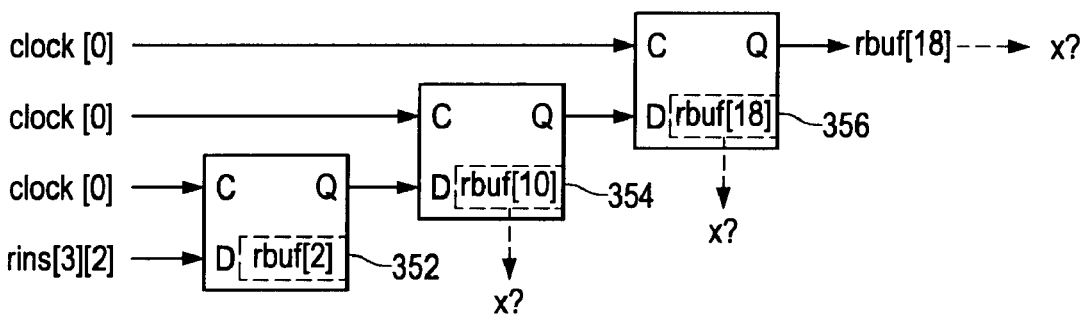
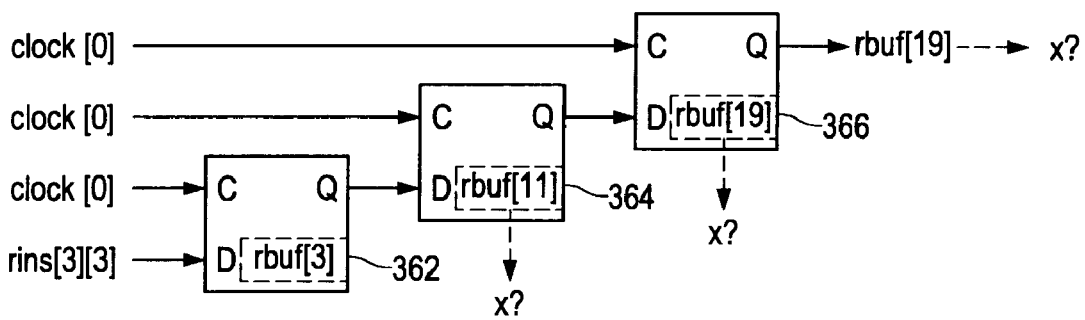

204: SAMPLING BIT STRING GENERATION UNIT (FLOW OF DETECTION PROCESSING)

SIGNAL PROCESSING APPARATUS AND SIGNAL PROCESSING METHOD

BACKGROUND OF THE INVENTION

1. Field of the Invention

The present invention relates to a signal processing apparatus and a signal processing method.

2. Description of the Related Art

For example, an amplitude modulation method and a phase modulation method are well known as digital modulation methods. The amplitude modulation method is also referred to as an ASK (Amplitude Shift Keying) method, i.e., a type of a digital modulation method that changes an amplitude of a carrier wave in accordance with transmission data. Another known example of the amplitude modulation method is an OSK (On-Off Shift Keying) method that associates data with either a presence or non-presence of an amplitude. On the other hand, the phase modulation method is also referred to as a PSK (Phase Shift Keying) method, i.e., a type of a digital modulation method that changes a phase of a carrier wave in accordance with transmission data. Exemplary types of the phase modulation method include a BPSK (Binary Phase Shift Keying) method, a QPSK (Quadrature Phase Shift Keying) method, and the like.

When data are transmitted by the phase modulation method, a receiver reproduces a carrier wave by, e.g., a synchronous demodulation method, and measures a phase difference between the carrier wave and the received signal, thus demodulating the data. Japanese Patent Application Laid-Open No. 2008-294730 discloses a data demodulation method of the phase demodulation method, and more specifically a technique for generating sampling data using a sampling clock having the same frequency as a carrier wave and detecting a correct phase range of the received signal to be sampled. In this technique, the sampling clock having the same frequency as the carrier wave is used to determine the data and the phase. Therefore, this technique alleviates the requirement of the operational rate, compared with a method in related art for processing data using a sampling frequency several times higher than a carrier wave. As a result, this technique enables efficient transmission of data using a carrier wave having a higher frequency.

SUMMARY OF THE INVENTION

The above technique described in Japanese Patent Application Laid-Open No. 2008-294730 will be described in more details. Firstly, the received signal is sampled using a plurality of sampling clocks having phases different from each other, and the obtained sampling data are used to generate detected data and phase data for each of the phases of the above plurality of sampling clocks. Further, in this technique, a sampling clock having a phase closest to the phase of the received signal is selected based on the generated detected data and the phase data, and the detected data detected using the phase of the selected sampling clock is demodulated. This method can achieve phase comparison processing and data detection processing by using a driving clock having the same frequency as a carrier wave without using analog-to-digital conversion.

However, an apparatus using the above technique includes logic cells containing the detected data and the phase data generated using phases of non-selected sampling clocks, thus resulting in a relatively complicated circuit configuration and a relatively large power consumption. Further, in this technique, when a carry or borrow occurs in the phase of the sampling clock, an overlap or dropout of data occurs. "Carry" occurring in the sampling clock means as follows: for example, when eight types of sampling clocks each having a phase delayed by one-eighth of the cycle are used, "carry" means a switching from a sampling clock delayed by seven-eighth of the cycle to a sampling clock without any delay. For example, when a modulation signal encoded by Manchester code is determined, a carry occurring in the sampling clock directly results in an overlap or dropout of data.

In light of the foregoing, it is desirable to provide a novel and improved information processing apparatus and signal processing method having a relatively simple configuration but capable of detecting sampling data having a phase close to an input phase modulation signal by using an operational clock having a frequency almost the same as a carrier wave.

According to an embodiment of the present invention, there is provided a signal processing apparatus which includes a sampling clock generation unit for generating a sampling clock by delaying, by a predetermined amount, a phase of a driving clock having the same frequency as a carrier wave; a logic data generation unit for generating a plurality of logic data in synchronization with the driving clock, wherein the plurality of logic data are generated by using the predetermined driving clock generated by the sampling clock generation unit to sample a modulation signal obtained by shifting a phase of the carrier wave; a sampling bit string generation unit for generating a sampling bit string having a length longer than one cycle of the carrier wave by shifting the logic data generated by the logic data generation unit in accordance with the predetermined driving clock; a phase error data generation unit for using a bit string corresponding to one cycle of the carrier wave extracted from the sampling bit string generated by the sampling bit string generation unit to generate phase error data representing an amount of shift between a phase of the bit string and the phase of the carrier wave; and an extraction position determination unit for determining, based on the phase error data generated by the phase error data generation unit, an extraction position of the bit string, corresponding to the one cycle, having a phase similar that of the carrier wave.

Furthermore, the logic data generation unit may sample an input signal in synchronization with a time of a leading edge of the sampling clock, and include a plurality of registers for storing the logic data obtained by sampling until a time of a subsequent leading edge, a register at a first stage receives a first sampling clock and the modulation signal, serving as the input signal, a register at a Nth stage (N≧2) receives the first sampling clock or a sampling clock having a phase closer to that of the predetermined driving clock than the first sampling clock, and the register at the Nth stage (N≧2) further receives the logic data stored in a register at a (N−1)th stage, and the sampling bit string generation unit uses the logic data stored in a register at a final stage to generate a sampling bit string having a length longer than one cycle of the carrier wave.

Furthermore, the phase error data generation unit includes a detected data calculation unit for calculating soft-decision data, serving as detected data, obtained by adding a predetermined first weight to each bit value in the bit string; a phase data calculation unit for calculating soft-decision data, serving as phase data, obtained by adding a predetermined second weight to each bit value in the bit string, wherein the predetermined second weight is different from the predetermined first weight; and a phase error data calculation unit for calculating the phase error data, based on the detected data calculated by the detected data calculation unit and the phase data calculated by the phase data calculation unit.

Furthermore, when the detected data calculated by the detected data calculation unit is negative, the phase error data calculation unit may output, as the phase error data, data obtained by reversing the sign of the phase data calculated by the phase data calculation unit, and when the detected data is positive, the phase error data calculation unit may output the phase data as the phase error data.

Furthermore, a preamble of the modulation signal may continuously include same bit values, before the preamble is detected, the phase error data calculation unit may output the phase data as the phase error data, and after the preamble is detected, the phase error data calculation unit may output, as the phase error data, the phase data whose sign is reversed in accordance with the sign of the detected data.

Furthermore, a preamble of the modulation signal may alternately include bit values different from each other, and when the detected data is close to zero, the phase error data calculation unit may output a predetermined value E (E>>0) as the phase error data.

Furthermore, when the extraction position of the bit string is close to a first bit or a last bit of the sampling bit string, the extraction position determination unit may shift the extraction position of the bit string to a position close to a central bit of the sampling bit string.

According to another embodiment of the present invention, there is provided a signal processing method, including the steps of generating a sampling clock by delaying, by a predetermined amount, a phase of a driving clock having the same frequency as a carrier wave; generating a plurality of logic data in synchronization with the driving clock, wherein the plurality of logic data are generated by using the predetermined driving clock generated by the sampling clock generating step to sample a modulation signal obtained by shifting a phase of the carrier wave; generating a sampling bit string having a length longer than one cycle of the carrier wave by shifting the logic data generated by the logic data generating step in accordance with the predetermined driving clock; using a bit string corresponding to one cycle of the carrier wave extracted from the sampling bit string generated by the sampling bit string generating step to generate phase error data representing an amount of shift between a phase of the bit string and the phase of the carrier wave; and determining, based on the phase error data generated by the phase error data generating step, an extraction position of the bit string, corresponding to the one cycle, having a phase similar that of the carrier wave.

According to the embodiments of the present invention described above, with a relatively simple configuration according to the present invention, sampling data having a phase close to an input phase modulation signal can be detected by using an operational clock having a frequency almost the same as a carrier wave.

BRIEF DESCRIPTION OF THE DRAWINGS

FIG. 7 shows an exemplary functional configuration of a sampling bit string generation unit according to the embodiment;

DETAILED DESCRIPTION OF THE EMBODIMENTS

Figure 1:
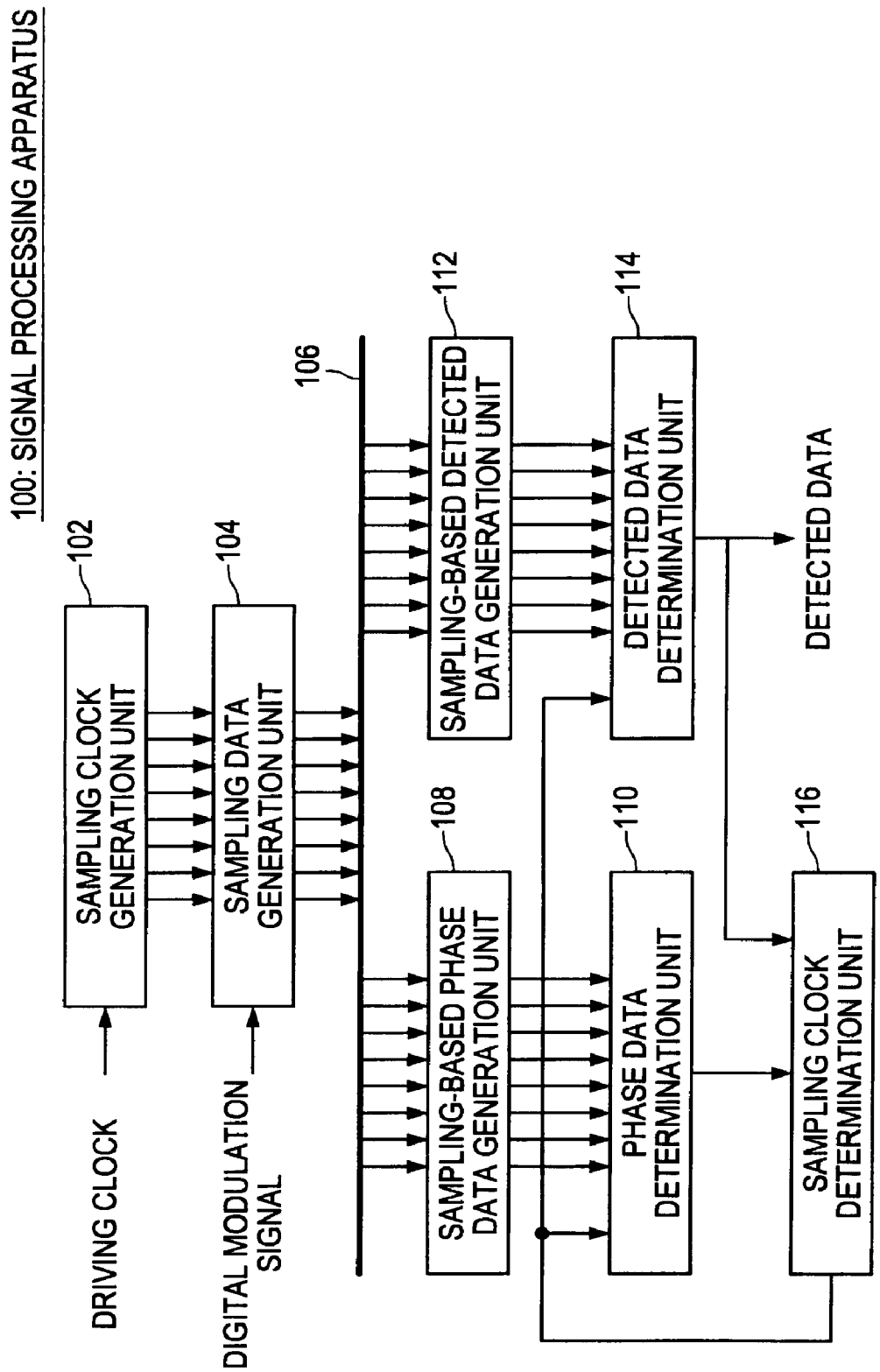
FIG. 1 shows an exemplary functional configuration of a signal processing apparatus for detecting data in a phase modulation signal by using a sampling clock having the same frequency as a carrier wave but having different phases from each other.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Explanation]

The flow of the below-described explanation about an embodiment according the present invention will be briefly described. First, a method for using a driving clock having the same frequency as a carrier wave to detect data from a phase modulation signal will be described with reference to FIG. 1. Subsequently, a functional configuration of a signal processing apparatus 200 according to the embodiment will be described with reference to FIG. 2. In this explanation, a particular configuration of a detection method according to the embodiment will be described with reference to FIG. 3 to FIG. 9. Subsequently, a flow of a detection processing according to the embodiment will be described with reference to FIG. 10 to FIG. 13.

(Items of Explanation)

1: Fundamental technology
      1-1: Functional configuration of signal processing apparatus 100
   2: Embodiment
      2-1: Functional configuration of signal processing apparatus 200
      2-2: Flow of processings performed by signal processing apparatus 200
      Solution 1: Method for changing method for generating phase data at preamble
      Solution 2: Method for causing many changes of data at preamble
      Solution 3: Shift of extraction range <1: Fundamental Technology>

Before explaining the embodiment according to the present invention, a technique for performing detection by using a driving clock having the same frequency as a carrier wave frequency will be briefly described. In the below explanation, this technique will be referred to as fundamental technology.

[1-1: Functional Configuration of Signal Processing Apparatus 100]

First, a functional configuration of the signal processing apparatus 100 according to the fundamental technology will be described with reference to FIG. 1. FIG. 1 is an explanatory diagram showing an exemplary configuration of the signal processing apparatus 100 according to the fundamental technology.

The signal processing apparatus 100 includes a sampling clock generation unit 102, a sampling data generation unit 104, and a bus 106. The signal processing apparatus 100 includes a sampling-based phase data generation unit 108, a phase data determination unit 110, a sampling-based detection data generation unit 112, a detected data determination unit 114, and a sampling clock determination unit 116.

First, the signal processing apparatus 100 receives a digital modulation signal transmitted from a transmitter (not shown). The received digital modulation signal is input to the sampling data generation unit 104. It should be noted that the digital modulation signal referred to herein means, for example, a signal generated by modulating a phase or amplitude of a carrier wave in accordance with baseband data. The digital modulation signal may have its central level be shifted to a reference level for logic determination.

(Sampling Clock Generation Unit 102)

Further, the sampling clock generation unit 102 receives a driving clock having about the same frequency as the carrier wave of the digital modulation signal. This driving clock is adapted to drive a digital circuit, and serves as a reference for controlling operational timing of the digital circuit. The sampling clock generation unit 102 generates a sampling clock by delaying the received driving clock by a time shorter than the interval of the driving clock. For example, the sampling clock generation unit 102 generates a plurality of sampling clocks having phases different from each other. The sampling clocks generated by the sampling clock generation unit 102 are input to the sampling data generation unit 104.

(Sampling Data Generation Unit 104)

When the sampling data generation unit 104 receives the plurality of sampling clocks from the sampling clock generation unit 102, the sampling data generation unit 104 uses the received sampling clocks to sample the digital modulation signal, thus generating sampling data. For example, the sampling data generation unit 104 generates the sampling data by executing logic determination on the digital modulation signal received at respective times of the sampling clocks. The sampling data generated by the sampling data generation unit 104 are input to the sampling-based detection data generation unit 112 and the sampling-based phase data generation unit 108 via the bus 106.

(Sampling-Based Detection Data Generation Unit 112)

When the sampling-based detection data generation unit 112 receives from the sampling data generation unit 104 the sampling data corresponding to the sampling clocks, the sampling-based detection data generation unit 112 generates detected data from the sampling data. The detected data are baseband data obtained from the sampling data. For example, the detected data are generated through detection performed on the assumption that the corresponding sampling clock is in synchronization with the carrier wave of the digital modulation signal. The detected data generated by the sampling-based detection data generation unit 112 are input to the detected data determination unit 114.

Further, the sampling-based detection data generation unit 112 may be configured to detect, based on the sampling data, sampling clocks that are not in synchronization with the carrier wave, and generate error data so as to avoid selection of such sampling clocks. Still further, the sampling-based detection data generation unit 112 determines an initial phase of the carrier wave based on the detected data and the error data. For example, the sampling-based detection data generation unit 112 selects one of the plurality of sampling clocks that is in synchronization with the carrier wave of the digital modulation signal obtained right after the detection started, and generates initial phase data representing the selected sampling clock. This initial phase data is input to the detected data determination unit 114.

(Detected Data Determination Unit 114)

The detected data determination unit 114 also receives phase comparison low-pass data from the later-described sampling clock determination unit 116. The phase comparison low-pass data referred to herein is data representing how much the phase of the carrier wave corresponding to the digital modulation signal is relatively shifted since the reception started. When the detected data determination unit 114 receives these data, the detected data determination unit 114 determines detected data that is detected using a sampling clock having a phase closest to the carrier wave from among the detected data of the sampling clocks, based on the received initial phase data and the received phase comparison low-pass data. The detected data determined by the detected data determination unit 114 is input to the sampling clock determination unit 116, and is output to a data determination processing block of a subsequent stage.

(Sampling-Based Phase Data Generation Unit 108)

Now, the sampling-based phase data generation unit 108 generates phase comparison data based on the sampling data received from the sampling data generation unit 104. The phase comparison data referred to herein represents how much the phases of the sampling clocks are relatively shifted with respect to the phase of the carrier wave. The phase comparison data generated by the sampling-based phase data generation unit 108 is input to the phase data determination unit 110.

(Phase Data Determination Unit 110)

The phase data determination unit 110 receives not only the phase comparison data but also the initial phase data generated by the sampling-based detection data generation unit 112 and the phase comparison low-pass data determined by the sampling clock determination unit 116. When the phase data determination unit 110 receives these data, the phase data determination unit 110 selects phase comparison data corresponding to the sampling clock having the phase closest to the phase of the carrier wave corresponding to the digital modulation signal from among the received phase comparison data, based on the received initial phase data and the phase comparison low-pass data. The phase comparison data selected by the phase data determination unit 110 is input to the sampling clock determination unit 116.

(Sampling Clock Determination Unit 116)

As described above, the sampling clock determination unit 116 receives the detected data from the detected data determination unit 114, and receives the phase comparison data from the phase data determination unit 110. When the sampling clock determination unit 116 receives these data, the sampling clock determination unit 116 detects the sampling clock having the phase closest to the phase of the carrier wave corresponding to the digital modulation signal. Further, the sampling clock determination unit 116 generates the phase comparison low-pass data based on the received detected data and the received phase comparison data. The phase comparison low-pass data is input to the detected data determination unit 114 and the phase data determination unit 110.

The exemplary configuration of the signal processing apparatus 100 has been described hereinabove. As described above, the signal processing apparatus 100 is configured to generate the plurality of sampling clock signals having the same frequency as the carrier wave frequency but having phases different from each other, and extract the plurality of sampling data from the digital modulation signal by using the sampling clocks. Then, the signal processing apparatus 100 selects the sampling clock having the phase similar to the phase of the carrier wave corresponding to the digital modulation signal from among the sampling data, and detects the sampling data corresponding to the selected sampling clock as the detected data.

In view of the phase shift between the sampling data and the carrier wave of the digital modulation signal, the selection processing of the sampling clock is repeatedly executed based on the phase comparison low-pass data generated by the sampling clock determination unit 116. As a result, the signal processing apparatus 100 outputs, as the detected data, the sampling data obtained by sampling the digital modulation signal using the sampling clock closest to the phase of the carrier wave corresponding to the digital modulation signal. As described above, since the detection processing of the detected data is executed using the sampling clock having the same frequency as the carrier wave, the driving clock of the signal processing apparatus 100 can be reduced to about the frequency of the carrier wave.

As a result, in contrast to data detection means in related art required of a driving clock several times higher than a carrier wave frequency, the signal processing apparatus 100 can handle a digital modulation signal modulated with a carrier wave having a high frequency. Further, since the signal processing apparatus 100 does not need an analog-to-digital converter as detection means, the power consumption can be reduced, and the circuit configuration can be simplified.

(Problems Residing in Signal Processing Apparatus 100)

However, the signal processing apparatus 100 configured as described above includes logic circuits operating at non-selected sampling clocks. Therefore, power saving is not sufficiently achieved, and the circuit configuration is not sufficiently simplified. Further, a carry or borrow occurring in a sampling clock causes an overlap or dropout of data, which is likely to cause error in data. In view of the above issues, the inventors of the present application have made further research and development, and has invented an apparatus having a better power saving feature and a more simplified circuit configuration than the above signal processing apparatus 100. This apparatus will be hereinafter described.

<2: Embodiment>

One embodiment according to the present invention will be hereinafter described. In the present embodiment, a method is suggested that includes the steps of generating sampling data of one or more cycles of carrier wave corresponding to the digital modulation signal, appropriately extracting one cycle of sampling data from the sampling data, reproducing data, and detecting phase data. In particular, the present embodiment is characterized by the method for appropriately extracting a range of one cycle of sampling data based on the detected data and the phase data. This method enables a better power saving feature and a more simplified circuit configuration than the above signal processing apparatus 100.

[2-1: Functional Configuration of Signal Processing Apparatus 200]

Figure 2:
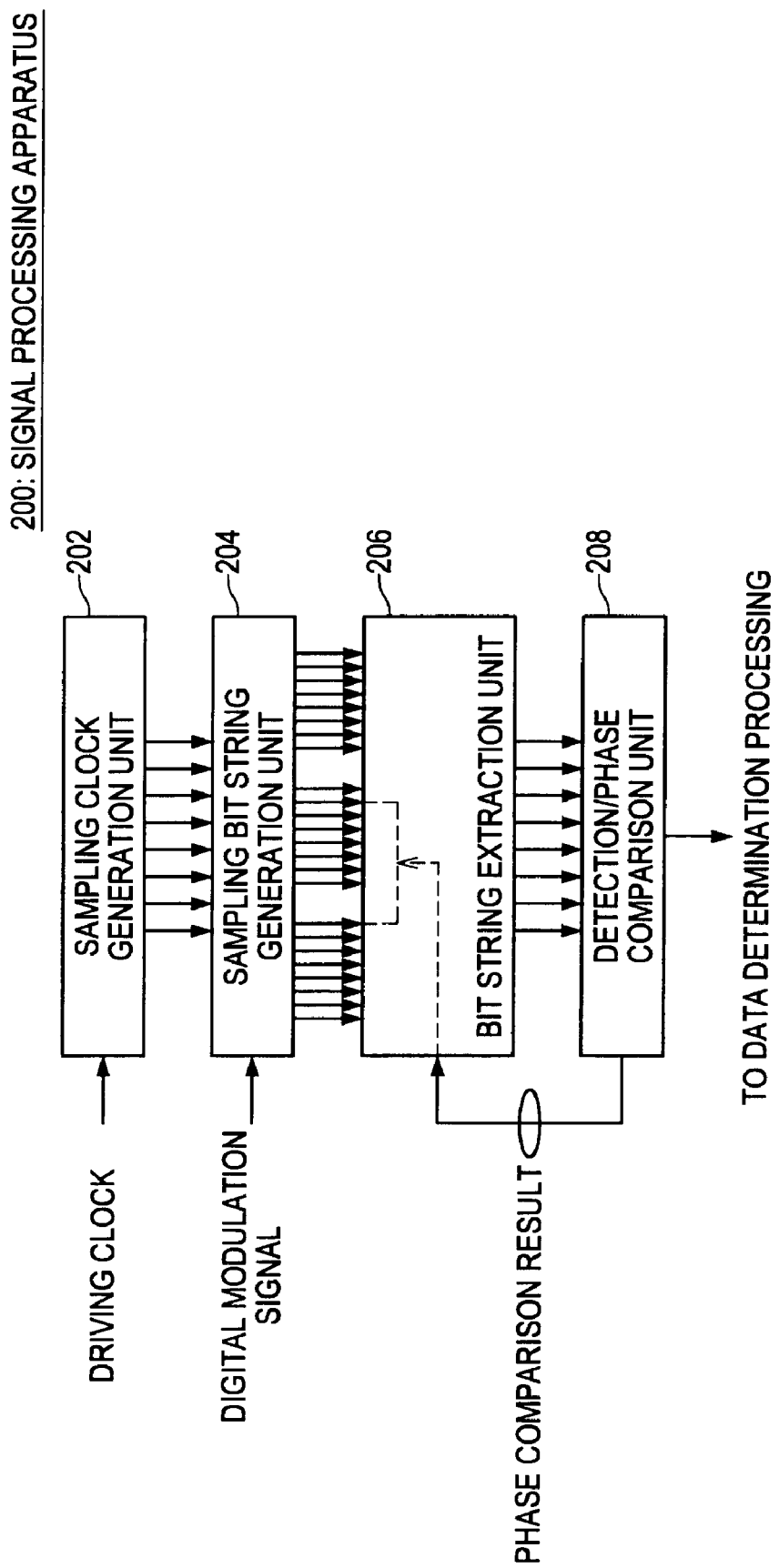
FIG. 2 shows an exemplary functional configuration of a signal processing apparatus according to an embodiment of the present invention.

First, the functional configuration of the signal processing apparatus 200 according to the present embodiment will be described with reference to FIG. 2. In this explanation, a circuit configuration and a flow of a processing method of each constituent element will be specifically described as necessary. FIG. 2 is an explanatory diagram showing an exemplary functional configuration of the signal processing apparatus 200 according to the present embodiment.

As shown in FIG. 2, the signal processing apparatus 200 mainly includes a sampling clock generation unit 202, a sampling bit string generation unit 204, a bit string extraction unit 206, and a detection/phase comparison unit 208.

It should be noted that the sampling clock generation unit 202 is an example of a sampling clock generation unit. The sampling bit string generation unit 204 is an example of a logic data generation unit and a sampling bit string generation unit. The detection/phase comparison unit 208 is an example of a phase error data generation unit, a detected data calculation unit, a phase data calculation unit, and a phase error data calculation unit. The bit string extraction unit 206 is an example of an extraction position determination unit.

First, the signal processing apparatus 200 receives the digital modulation signal transmitted from a transmitter (not shown). The received digital modulation signal is input to the sampling bit string generation unit 204. The digital modulation signal referred to herein means, for example, a signal generated by modulating a phase or amplitude of a carrier wave in accordance with baseband data. The digital modulation signal may have its central level be shifted to a reference level for logic determination.

(Sampling Clock Generation Unit 202)

Further, the sampling clock generation unit 202 receives a driving clock having about the same frequency as the carrier wave of the digital modulation signal. This driving clock is adapted to drive a digital circuit, and serves as a reference for controlling operational timing of the digital circuit. The sampling clock generation unit 202 generates a sampling clock by delaying the received driving clock by a time shorter than the interval of the driving clock. For example, the sampling clock generation unit 202 generates a plurality of sampling clocks having phases different from each other. The sampling clocks generated by the sampling clock generation unit 202 are input to the sampling data generation unit 204.

(Exemplary Specific Configuration of Sampling Clock Generation Unit 202)

Figure 3:
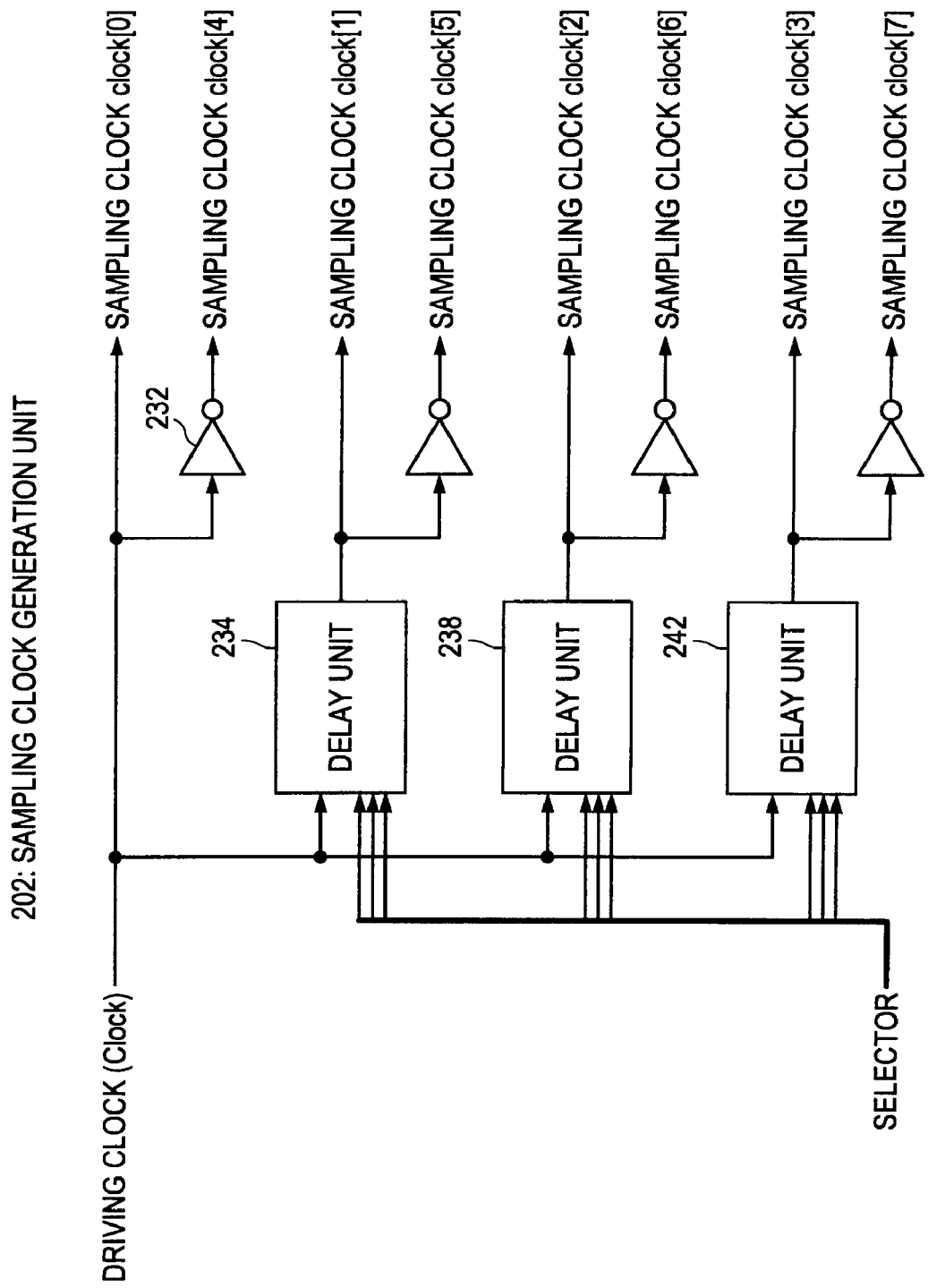
FIG. 3 shows an exemplary functional configuration of a sampling clock generation unit according to the embodiment.

Herein, an exemplary specific configuration of the sampling clock generation unit 202 will be described with reference to FIG. 3. FIG. 3 is an explanatory diagram showing one example of the specific circuit configuration of the sampling clock generation unit 202. When the sampling clock generation unit 202 shown in FIG. 3 as an example receives a driving clock (Clock), the sampling clock generation unit 202 generates eight sampling clocks having phases shifted by integral multiples of one-eighth of the cycle of the driving clock.

As shown in FIG. 3, the sampling clock generation unit 202 includes delay units 234, 238 and 242 and inverters 232, 236, 240 and 244. The functions of the delay units 234, 238 and 242 are achieved by, for example, programmable delay elements. The functions of the inverters 232, 236, 240 and 244 are achieved by, for example, an inverter circuit operating at a higher rate than the cycle of the driving clock.

First, the sampling clock generation unit 202 receives the driving clock (Clock). The received driving clock is output as a sampling clock [0] and input to the delay units 234, 238 and 242 and the inverter 232. Since the sampling clock [0] is a driving clock by itself, the sampling clock [0] has the same phase as the driving clock.

Further, the inverter 232 reverses the received driving clock. The reversed driving clock is output as a sampling clock [4]. Since the sampling clock [4] is obtained by reversing the driving clock, the sampling clock [4] has a phase delayed by four-eighth of the cycle with respect to the sampling clock [0].

The delay unit 234 delays the driving clock by one-eighth of the cycle in accordance with a control signal received from a selector. The delayed driving clock is output as a sampling clock [1], and is input to the inverter 236. Since the sampling clock [1] is obtained by delaying the driving clock by one-eighth of the cycle, the sampling clock [1] has a phase delayed by one-eighth of the cycle with respect to the sampling clock [0].

The inverter 236 reverses the driving clock (corresponding to the sampling clock [1]) delayed by one-eighth of the cycle. The reversed driving clock is output as a sampling clock [5]. Since the sampling clock [5] is obtained by reversing the driving clock delayed by one-eighth of the cycle, the sampling clock [5] has a phase delayed by five-eighth of the cycle with respect to the sampling clock [0].

The delay unit 238 delays the driving clock by two-eighth of the cycle in accordance with a control signal input from the selector. The delayed driving clock is output as a sampling clock [2], and is input to the inverter 240. Since the sampling clock [2] is obtained by delaying the driving clock by two-eighth of the cycle, the sampling clock [2] has a phase delayed by two-eighth of the cycle with respect to the sampling clock [0].

The inverter 240 reverses the driving clock (corresponding to the sampling clock [2]) delayed by two-eighth of the cycle. The reversed driving clock is output as a sampling clock [6]. Since the sampling clock [6] is obtained by reversing the driving clock delayed by two-eighth of the cycle, the sampling clock [6] has a phase delayed by six-eighth of the cycle with respect to the sampling clock [0].

The delay unit 242 delays the driving clock by three-eighth of the cycle in accordance with a control signal input from the selector. The delayed driving clock is output as a sampling clock [3], and is input to the inverter 244. Since the sampling clock [3] is obtained by delaying the driving clock by three-eighth of the cycle, the sampling clock [3] has a phase delayed by three-eighth of the cycle with respect to the sampling clock [0].

The inverter 244 reverses the driving clock (corresponding to the sampling clock [3]) delayed by three-eighth of the cycle. The reversed driving clock is output as a sampling clock [7]. Since the sampling clock [7] is obtained by reversing the driving clock delayed by three-eighth of the cycle, the sampling clock [7] has a phase delayed by seven-eighth of the cycle with respect to the sampling clock [0].

As described above, the eight kinds of sampling clocks, i.e., the sampling clocks [0] to [7], having phases different from each other are generated. In the example of FIG. 3, the delay units 234, 238 and 242 are arranged in parallel. Alternatively, for example, three delay circuits for delaying the driving clock by one-eighth of the cycle may be arranged in series. In the example of FIG. 3, the sampling clock is generated by making use of the fact that the phase is delayed by π upon reversing the driving clock. Therefore, a signal having a duty ratio of almost 50% is preferably used as the driving clock.

The sampling clocks [0] to [7] thus generated are input to the sampling bit string generation unit 204. In the above example, the digital modulation signal is assumed to be a Manchester Code and a Binary Phase Shift Keying Signal. For such signals, it may be necessary that the phase of the carrier wave be divided into one-eighth, and eight types of sampling clocks having different phases be prepared as described in the above example. For example, in a case where there are half the number of sampling clocks, i.e., four types of sampling clocks, a phase shift by only one sampling clock makes it difficult to detect data. Therefore, when a Manchester Code and a Binary Phase Shift Keying Signal are used, it is adequate to use about eight types of sampling clocks. When a Quaternary Phase Shift Keying Signal, it is adequate to use about sixteen types of sampling clocks.

(Sampling Bit String Generation Unit 204)

FIG. 2 is referenced again. When the sampling bit string generation unit 204 receives a plurality of sampling clocks from the sampling clock generation unit 202, the sampling bit string generation unit 204 uses the received sampling clocks to sample the digital modulation signal, thus generating the sampling data. At this moment, the sampling bit string generation unit 204 generates the sampling data having a length of one or more cycles of the carrier wave (for example, three cycles of the carrier wave). The sampling data generated by the sampling bit string generation unit 204 are input to the bit string extraction unit 206.

(Exemplary Specific Configuration of Sampling Bit String Generation Unit 204)

Herein, an exemplary specific configuration of the sampling bit string generation unit 204 will be described with reference to FIG. 4 to FIG. 9. FIG. 4 to FIG. 9 are explanatory diagrams showing the exemplary specific circuit configuration of the sampling bit string generation unit 204.

The functions of the sampling bit string generation unit 204 are achieved by a circuit configuration (four types of D flip-flops) schematically shown in FIG. 4, FIG. 5, FIG. 7 and FIG. 8. Input/output configurations of the D flip-flops serving as registers are summarized in a table format in FIG. 6 and FIG. 9. Herein, an example will be described where 24-bit sampling data is generated from three 8-bit sampling bit string.

(Exemplary Circuit Configuration)

Figure 4:
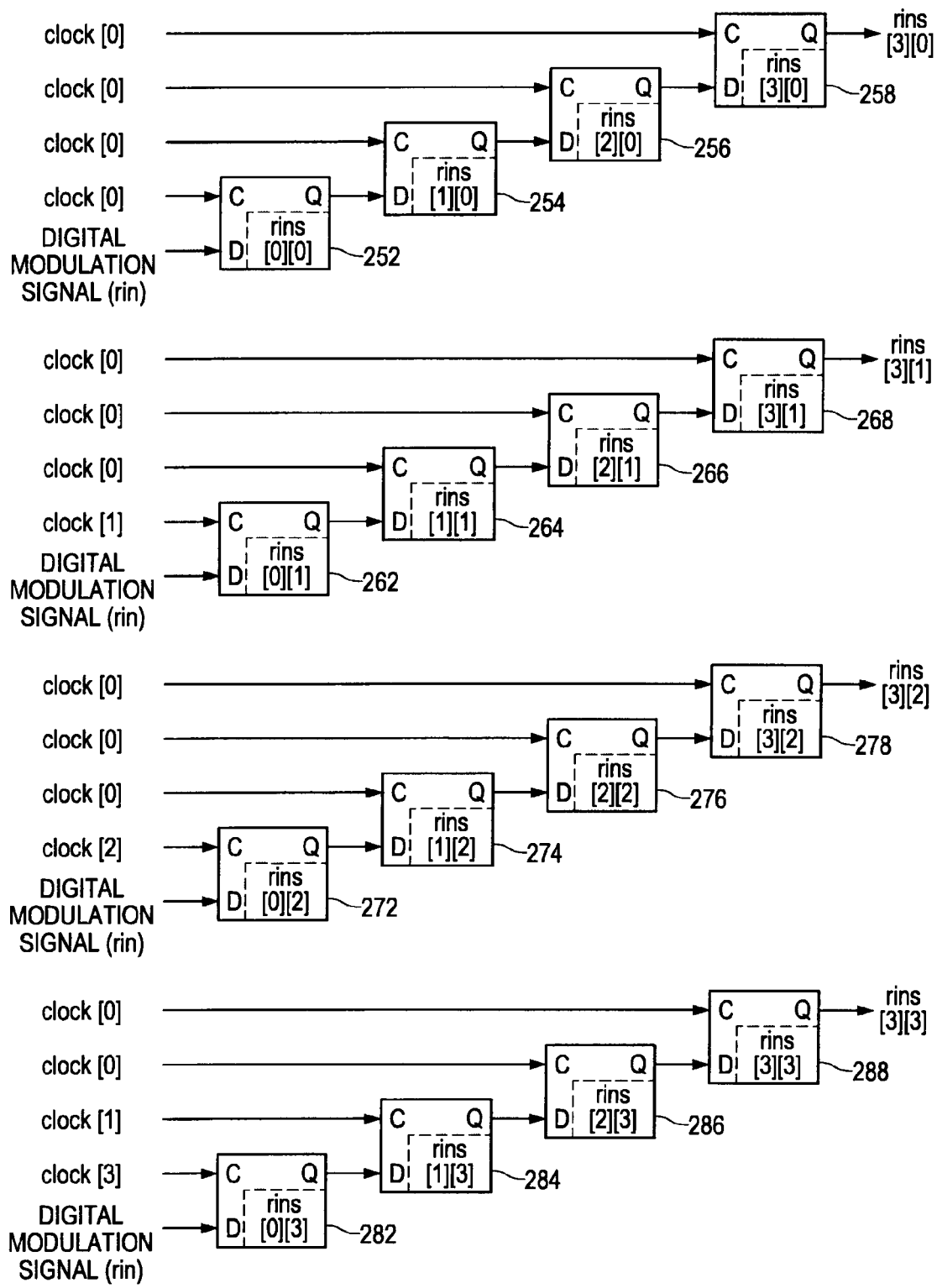
FIG. 4 shows an exemplary functional configuration of a sampling bit string generation unit according to the embodiment.
Figure 5:
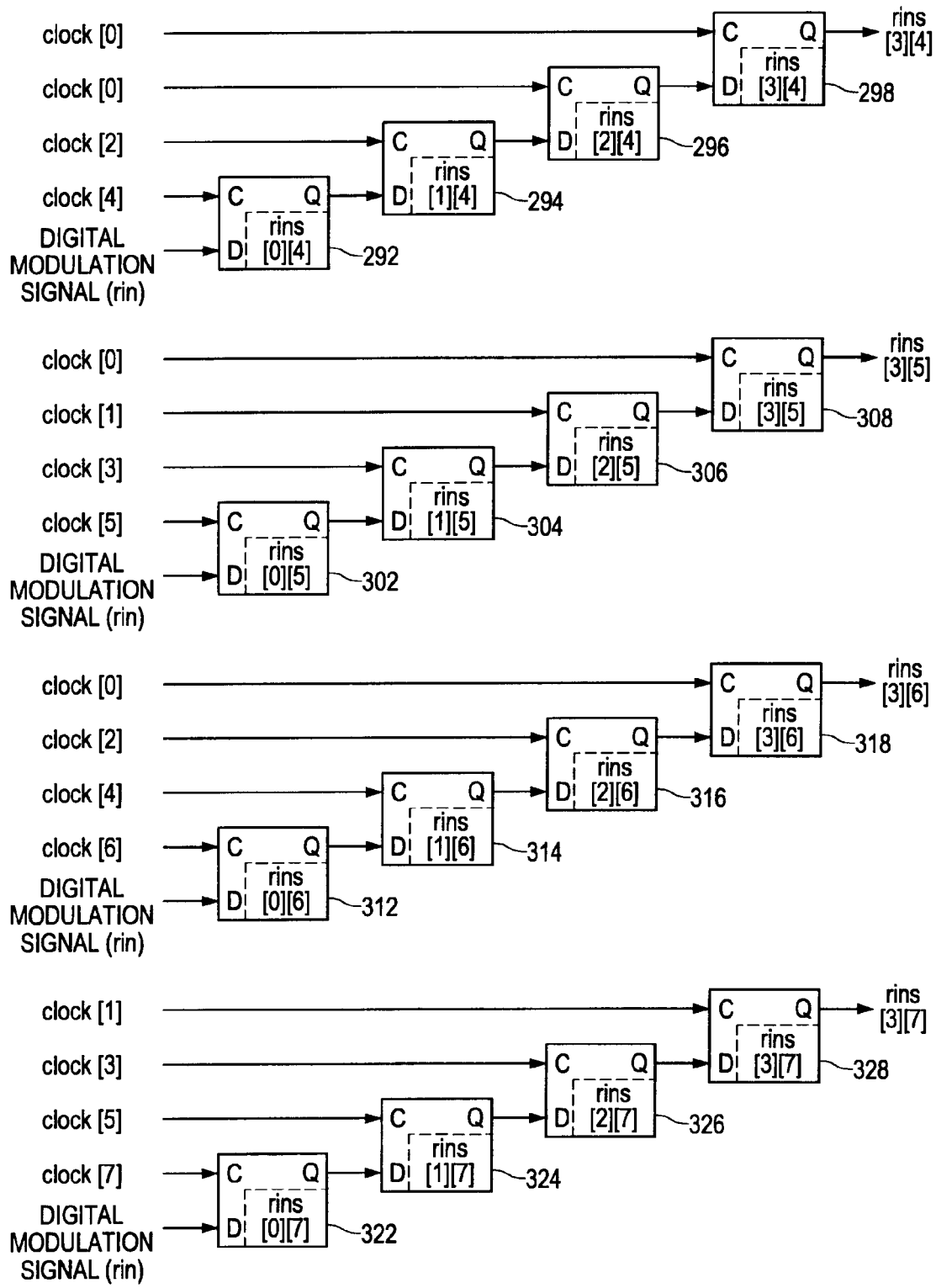
FIG. 5 shows an exemplary functional configuration of a sampling bit string generation unit according to the embodiment.

First, FIG. 4 and FIG. 5 are referenced. The sampling bit string generation unit 204 has a shift register constituted by D flip-flops 252, 254, 256 and 258 in order to generate a sampling bit corresponding to bit 0. Similarly, the sampling bit string generation unit 204 has a shift register constituted by D flip-flops 262, 264, 266 and 268 in order to generate a sampling bit corresponding to bit 1.

The sampling bit string generation unit 204 has a shift register constituted by D flip-flops 272, 274, 276 and 278 in order to generate a sampling bit corresponding to bit 2. Similarly, the sampling bit string generation unit 204 has a shift register constituted by D flip-flops 282, 284, 286 and 288 in order to generate a sampling bit corresponding to bit 3.

The sampling bit string generation unit 204 has a shift register constituted by D flip-flops 292, 294, 296 and 298 in order to generate a sampling bit corresponding to bit 4. Similarly, the sampling bit string generation unit 204 has a shift register constituted by D flip-flops 302, 304, 306 and 308 in order to generate a sampling bit corresponding to bit 5.

The sampling bit string generation unit 204 has a shift register constituted by D flip-flops 312, 314, 316 and 318 in order to generate a sampling bit corresponding to bit 6. Similarly, the sampling bit string generation unit 204 has a shift register constituted by D flip-flops 322, 324, 326 and 328 in order to generate a sampling bit corresponding to bit 7. As described above, the sampling bit string generation unit 204 is constituted by eight shift registers.

(Generation of Sampling Bit Corresponding to Bit 0)

First, the functions of the shift register (corresponding to bit 0) constituted by the D flip-flops 252, 254, 256 and 258 will be described with reference to FIG. 4. Herein, the sampling clock [0] is assumed to be the same as the driving clock.

(Processing S1 of Shift Register at First Stage)

A digital modulation signal rin is input to a D terminal of the D flip-flop 252. The sampling clock [0] is input to a C terminal of the D flip-flop 252. The D flip-flop 252 samples a portion of the digital modulation signal rin input to the D terminal at a time of a leading edge of the sampling clock [0] input to the C terminal, thus generating logic data rins [0][0]. The logic data rins [0][0] obtained by the sampling is output from the Q terminal of the D flip-flop 252.

(Processing S2 of Intermediate Shift Register)

The logic data rins [0][0] output from the Q terminal of the D flip-flop 252 is input to a D terminal of the D flip-flop 254. The sampling clock [0] is input to a C terminal of the D flip-flop 254. The D flip-flop 254 samples a portion of the logic data rins [0][0] input to the D terminal at the time of the leading edge of the sampling clock [0] input to the C terminal, thus generating logic data rins [1][0]. The logic data rins [1][0] obtained by the sampling is output from the Q terminal of the D flip-flop 254.

(Processing S3 of Intermediate Shift Register)

The logic data rins [1][0] output from the Q terminal of the D flip-flop 254 is input to a D terminal of the D flip-flop 256. The sampling clock [0] is input to a C terminal of the D flip-flop 256. The D flip-flop 256 samples a portion of the logic data rins [1][0] input to the D terminal at the time of the leading edge of the sampling clock [0] input to the C terminal, thus generating logic data rins [2][0]. The logic data rins [2][0] obtained by the sampling is output from the Q terminal of the D flip-flop 256.

(Processing S4 of Intermediate Shift Register)

The logic data rins [2][0] output from the Q terminal of the D flip-flop 256 is input to a D terminal of the D flip-flop 258. The sampling clock [0] is input to a C terminal of the D flip-flop 258. The D flip-flop 258 samples a portion of the logic data rins [2][0] input to the D terminal at the time of the leading edge of the sampling clock [0] input to the C terminal, thus generating logic data rins [3][0]. The logic data rins [3][0] obtained by the sampling is output from the Q terminal of the D flip-flop 258.

As described above, the digital modulation signal rin is sampled at the time of the leading edge of the sampling clock [0], and the sampling bit rins [3][0] in synchronization with the sampling clock [0] is output.

(Generation of Sampling Bit Corresponding to Bit 1)

Subsequently, the functions of the shift register (corresponding to bit 1) constituted by the D flip-flops 262, 264, 266, and 268 will be described.

(Processing S1 of Shift Register at First Stage)

The digital modulation signal rin is input to a D terminal of the D flip-flop 262. The sampling clock [1] is input to a C terminal of the D flip-flop 262. The D flip-flop 262 samples a portion of the digital modulation signal rin input to the D terminal at a time of a leading edge of the sampling clock [1] input to the C terminal, thus generating logic data rins [0][1]. The logic data rins [0][1] obtained by the sampling is output from the Q terminal of the D flip-flop 262.

(Processing S2 of Intermediate Shift Register)

The logic data rins [0][1] output from the Q terminal of the D flip-flop 262 is input to a D terminal of the D flip-flop 264. The sampling clock [0] is input to a C terminal of the D flip-flop 264. The D flip-flop 264 samples a portion of the logic data rins [0][1] input to the D terminal at the time of the leading edge of the sampling clock [0] input to the C terminal, thus generating logic data rins [1][1]. The logic data rins [1][1] obtained by the sampling is output from the Q terminal of the D flip-flop 264.

(Processing S3 of Intermediate Shift Register)

The logic data rins [1][1] output from the Q terminal of the D flip-flop 264 is input to a D terminal of the D flip-flop 266. The sampling clock [0] is input to a C terminal of the D flip-flop 266. The D flip-flop 266 samples a portion of the logic data rins [1][1] input to the D terminal at the time of the leading edge of the sampling clock [0] input to the C terminal, thus generating logic data rins [2][1]. The logic data rins [2][1] obtained by the sampling is output from the Q terminal of the D flip-flop 266.

(Processing S4 of Intermediate Shift Register)

The logic data rins [2][1] output from the Q terminal of the D flip-flop 266 is input to a D terminal of the D flip-flop 268. The sampling clock [0] is input to a C terminal of the D flip-flop 268. The D flip-flop 268 samples a portion of the logic data rins [2][1] input to the D terminal at the time of the leading edge of the sampling clock [0] input to the C terminal, thus generating logic data rins [3][1]. The logic data rins [3][1] obtained by the sampling is output from the Q terminal of the D flip-flop 268.

As described above, the digital modulation signal rin is sampled at the time of the leading edge of the sampling clock [1], and the sampling bit rins [3][1] in synchronization with the sampling clock [0] is output.

(Generation of Sampling Bit Corresponding to Bit 2)

Subsequently, the functions of the shift register (corresponding to bit 2) constituted by the D flip-flops 272, 274, 276 and 278 will be described.

(Processing S1 of Shift Register at First Stage)

The digital modulation signal rin is input to a D terminal of the D flip-flop 272. The sampling clock [2] is input to a C terminal of the D flip-flop 272. The D flip-flop 272 samples a portion of the digital modulation signal rin input to the D terminal at a time of a leading edge of the sampling clock [2] input to the C terminal, thus generating logic data rins [0][2]. The logic data rins [0][2] obtained by the sampling is output from the Q terminal of the D flip-flop 272.

(Processing S2 of Intermediate Shift Register)

The logic data rins [0][2] output from the Q terminal of the D flip-flop 272 is input to a D terminal of the D flip-flop 274. The sampling clock [0] is input to a C terminal of the D flip-flop 274. The D flip-flop 274 samples a portion of the logic data rins [0][2] input to the D terminal at the time of the leading edge of the sampling clock [0] input to the C terminal, thus generating logic data rins [1][2]. The logic data rins [1][2] obtained by the sampling is output from the Q terminal of the D flip-flop 274.

(Processing S3 of Intermediate Shift Register)

The logic data rins [1][2] output from the Q terminal of the D flip-flop 274 is input to a D terminal of the D flip-flop 276. The sampling clock [0] is input to a C terminal of the D flip-flop 276. The D flip-flop 276 samples a portion of the logic data rins [1][2] input to the D terminal at the time of the leading edge of the sampling clock [0] input to the C terminal, thus generating logic data rins [2][2]. The logic data rins [2][2] obtained by the sampling is output from the Q terminal of the D flip-flop 276.

(Processing S4 of Intermediate Shift Register)

The logic data rins [2][2] output from the Q terminal of the D flip-flop 276 is input to a D terminal of the D flip-flop 278. The sampling clock [0] is input to a C terminal of the D flip-flop 278. The D flip-flop 278 samples a portion of the logic data rins [2][2] input to the D terminal at the time of the leading edge of the sampling clock [0] input to the C terminal, thus generating logic data rins [3][2]. The logic data rins [3][2] obtained by the sampling is output from the Q terminal of the D flip-flop 278.

As described above, the digital modulation signal rin is sampled at the time of the leading edge of the sampling clock [2], and the sampling bit rins [3][2] in synchronization with the sampling clock [0] is output.

(Generation of Sampling Bit Corresponding to Bit 3)

Subsequently, the functions of the shift register (corresponding to bit 3) constituted by the D flip-flops 282, 284, 286 and 288 will be described.

(Processing S1 of Shift Register at First Stage)

The digital modulation signal rin is input to a D terminal of the D flip-flop 282. The sampling clock [3] is input to a C terminal of the D flip-flop 282. The D flip-flop 282 samples a portion of the digital modulation signal rin input to the D terminal at a time of a leading edge of the sampling clock [3] input to the C terminal, thus generating logic data rins [0][3]. The logic data rins [0][3] obtained by the sampling is output from the Q terminal of the D flip-flop 282.

(Processing S2 of Intermediate Shift Register)

The logic data rins [0][3] output from the Q terminal of the D flip-flop 282 is input to a D terminal of the D flip-flop 284. The sampling clock [1] is input to a C terminal of the D flip-flop 284. The D flip-flop 284 samples a portion of the logic data rins [0][3] input to the D terminal at the time of the leading edge of the sampling clock [1] input to the C terminal, thus generating logic data rins [1][3]. The logic data rins [1][3] obtained by the sampling is output from the Q terminal of the D flip-flop 284.

(Processing S3 of Intermediate Shift Register)

The logic data rins [1][3] output from the Q terminal of the D flip-flop 284 is input to a D terminal of the D flip-flop 286. The sampling clock [0] is input to a C terminal of the D flip-flop 286. The D flip-flop 286 samples a portion of the logic data rins [1][3] input to the D terminal at the time of the leading edge of the sampling clock [0] input to the C terminal, thus generating logic data rins [2][3]. The logic data rins [2][3] obtained by the sampling is output from the Q terminal of the D flip-flop 286.

(Processing S4 of Intermediate Shift Register)

The logic data rins [2][3] output from the Q terminal of the D flip-flop 286 is input to a D terminal of the D flip-flop 288. The sampling clock [0] is input to a C terminal of the D flip-flop 288. The D flip-flop 288 samples a portion of the logic data rins [2][3] input to the D terminal at the time of the leading edge of the sampling clock [0] input to the C terminal, thus generating logic data rins [3][3]. The logic data rins [3][3] obtained by the sampling is output from the Q terminal of the D flip-flop 288.

As described above, the digital modulation signal rin is sampled at the time of the leading edge of the sampling clock [3], and the sampling bit rins [3][3] in synchronization with the sampling clock [0] is output.

(Generation of Sample Bit Corresponding to Bits 4 to 7)

Subsequently, the functions of the shift register (corresponding to bit 4) constituted by the D flip-flops 292, 294, 296 and 298 will be described with reference to FIG. 5. Further, the functions of the shift register (corresponding to bits 5 to 7) constituted by the D flip-flops 302, 304, 306, 308, 312, 314, 316, 318, 322, 324, 326 and 328 will be described with reference to FIG. 5.

The circuit configuration of the sampling bit string generation unit 204 shown in FIG. 5 is substantially the same as the circuit configuration shown in FIG. 4. However, the circuit configuration of FIG. 5 are different in a combination of sampling clocks [k] (k=0 to 7) input to each of the D flip-flops 292, 294, 296, 298, 302, 304, 306, 308, 312, 314, 316, 318, 322, 324, 326 and 328. Therefore, a combination of sampling clocks [k] input to each shift register and a combination of sampling bits rins [3][m] (m=4 to 7) output therefrom are briefly described, and the explanation about the detailed circuit configuration is omitted.

(Generation of Sample Bit Corresponding to Bit 4)

The shift register corresponding to bit 4 is constituted by the D flip-flops 292, 294, 296 and 298. The sampling clock [4] is input to a C terminal of the D flip-flop 292. The sampling clock [2] is input to a C terminal of the D flip-flop 294. The sampling clock [0] is input to C terminals of the D flip-flops 296 and 298. A sampling bit rins [3][4] is output from a Q terminal of the D flip-flop 298.

This sampling bit rins[3][4] is obtained by sampling the digital modulation signal rin at a time of a leading edge of the sampling clock [4], and is in synchronization with the sampling clock [0].

(Generation of Sampling Bit Corresponding to Bit 5)

The shift register corresponding to bit 5 is constituted by the D flip-flops 302, 304, 306 and 308. The sampling clock [5] is input to a C terminal of the D flip-flop 304. The sampling clock [1] is input to a C terminal of the D flip-flop 306. The sampling clock [0] is input to a C terminal of the D flip-flop 306. As a result, a sampling bit rins [3][5] is output from a Q terminal of the D flip-flop 308.

This sampling bit rins[3][5] is obtained by sampling the digital modulation signal rin at a time of a leading edge of the sampling clock [5], and is in synchronization with the sampling clock [0].

(Generation of Sampling Bit Corresponding to Bit 6)

The shift register corresponding to bit 6 is constituted by the D flip-flops 312, 314, 316 and 318. The sampling clock [6] is input to a C terminal of the D flip-flop 312. The sampling clock [4] is input to a C terminal of the D flip-flop 314. The sampling clock [2] is input to a C terminal of the D flip-flop 316. The sampling clock [0] is input to a C terminal of the D flip-flop 316. As a result, a sampling bit rins [3][6] is output from a Q terminal of the D flip-flop 318.

This sampling bit rins[3][6] is obtained by sampling the digital modulation signal rin at a time of a leading edge of the sampling clock [6], and is in synchronization with the sampling clock [0].

(Generation of Sampling Bit Corresponding to Bit 7)

The shift register corresponding to bit 7 is constituted by the D flip-flops 322, 324, 326 and 328. The sampling clock [7] is input to a C terminal of the D flip-flop 322. The sampling clock [5] is input to a C terminal of the D flip-flop 324. The sampling clock [3] is input to a C terminal of the D flip-flop 326. The sampling clock [1] is input to a C terminal of the D flip-flop 328. As a result, a sampling bit rins [3][7] is output from a Q terminal of the D flip-flop 328.

This sampling bit rins [3][7] is obtained by sampling the digital modulation signal rin at a time of a leading edge of the sampling clock [7], and is in synchronization with the sampling clock [1]. However, the sampling bit rins [3][7] is obtained at a time of a subsequent leading edge of the sampling clock [0] after the leading edge of the sampling clock [1]. As a result, the obtained sampling bit rins[3][7] is in synchronization with the sampling clock [0].

(Summary of Circuit Configuration)

The portion of the circuit configuration of the sampling bit string generation unit 204 has been described hereinabove with reference to FIG. 4 and FIG. 5. As described above, the sampling bit string generation unit 204 appropriately combines the sampling clocks [k] input to the registers so as to sample the digital modulation signal at different times based on one-eighth of the clock of the carrier wave, thus providing a register rins [3] containing the sampling bit string for performing update using the same clock.

Figure 6:
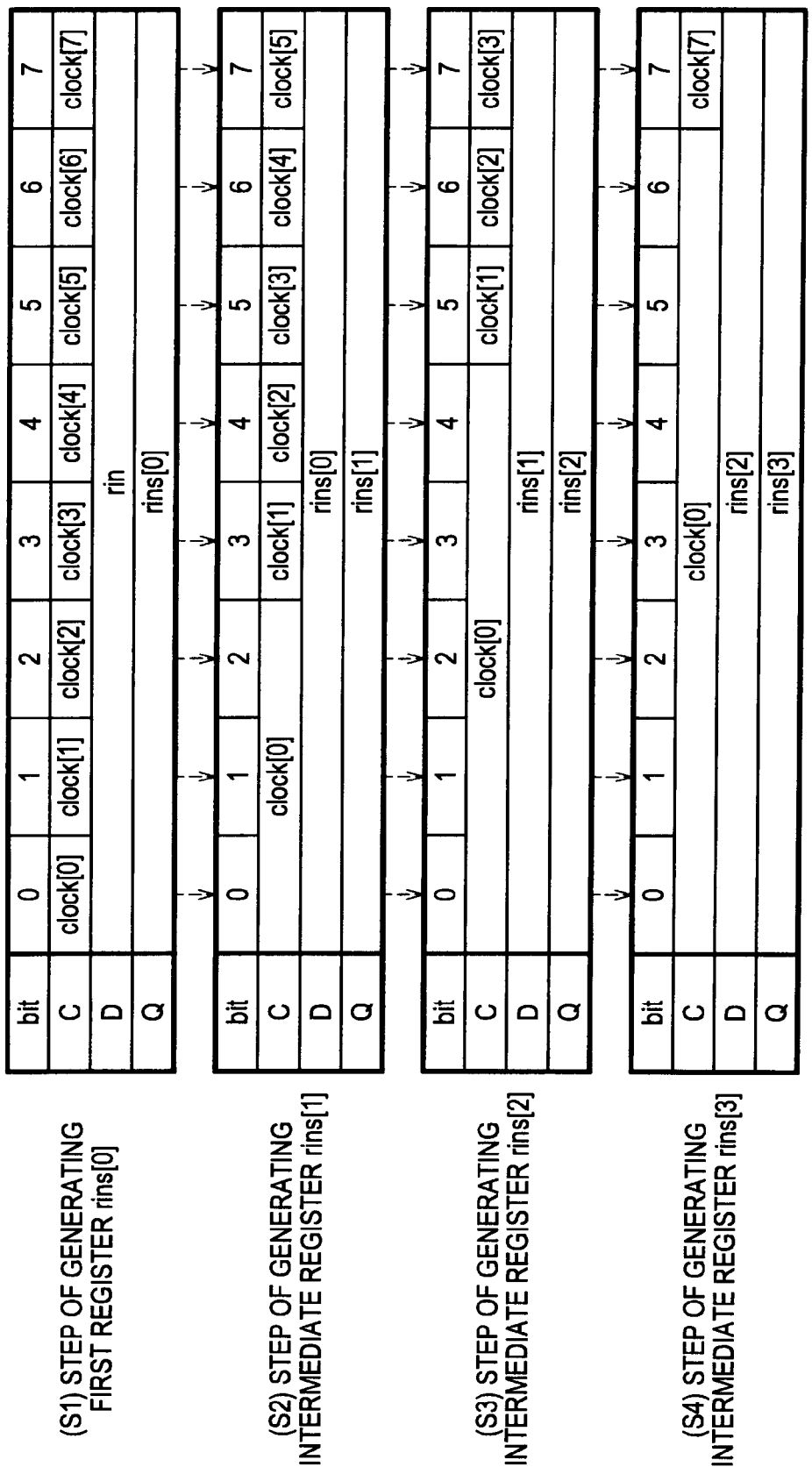
FIG. 6 shows a method for generating a sampling bit string according to the embodiment.

In particular, the above circuit configuration provides the sampling bit string rins [3] in which the sampling bits rins [3][m] (m=0 to 7) are in synchronization with the sampling clock [0]. FIG. 6 is a summary in table format showing a combination of the sampling clocks [k] input to the registers and a combination of the logic data rins [n][m](n=0 to 3, m=0 to 7) output from the registers. FIG. 6 is an explanatory diagram showing a method for generating the sampling bit string (of one cycle).

As shown in FIG. 6, when the sampling clocks different for each bit are input to the register of the first stage, the digital modulation signal rin is sampled with each sampling clock, and the logic data rins [0] corresponding to the sampling clocks are output (S1). Subsequently, the logic data rins [0] output from the register of the first stage and predetermined sampling clocks set for each bit are input to the register of the second stage, so that the logic data rins [0] is sampled with the sampling clocks for each bit. Then, the logic data rins [1] obtained from the sampling is output (S2).

Subsequently, the logic data rins [1] output from the register of the second stage and the predetermined sampling clocks set for each bit are input to the register of the third stage, so that the logic data rins [1] is sampled with the sampling clocks for each bit. Then, the logic data rins [2] obtained from the sampling is output (S3). Subsequently, the logic data rins [2] output from the register of the third stage and the predetermined sampling clocks set for each bit are input to the register of the fourth stage, so that the logic data rins [2] is sampled with the sampling clocks for each bit. Then, the logic data rins [3] obtained from the sampling is output (S4).

As described above, the sampling bit string generation unit 204 causes the register of the first stage to extract the digital modulation signal at the time of the leading edge of the sampling clock, and thereafter, uses the plurality of registers to gradually bring the phase of the sampling bit closer to the phase of the sampling clock [0]. Ultimately, in the register at the fourth stage, each bit of the sampling bit string rins [3] is in synchronization with the sampling clock [0]. As a result, each sampling bit can be synchronized with the sampling clock [0] (driving clock) and can be simultaneously processed. In other words, it is not necessary to take into consideration a time taken for each sampling bit to settle, and it is possible to greatly alleviate the restriction placed upon the frequency of the driving clock due to the settling time.

(Expansion of Bit String by Shift Register)

The above circuit configuration and the above method generate 8-bit sampling bit string rins [3][m] (m=0 to 7) corresponding to one cycle of the carrier wave frequency. Subsequently, the sampling bit string generation unit 204 uses the sampling bit string rins [3][m] (m=0 to 7) obtained from the above configuration to generate 24-bit sampling bit string rbuf [n] (n=0 to 23) corresponding to three cycles of the carrier wave frequency.

(Exemplary Circuit Configuration)

Figure 8:
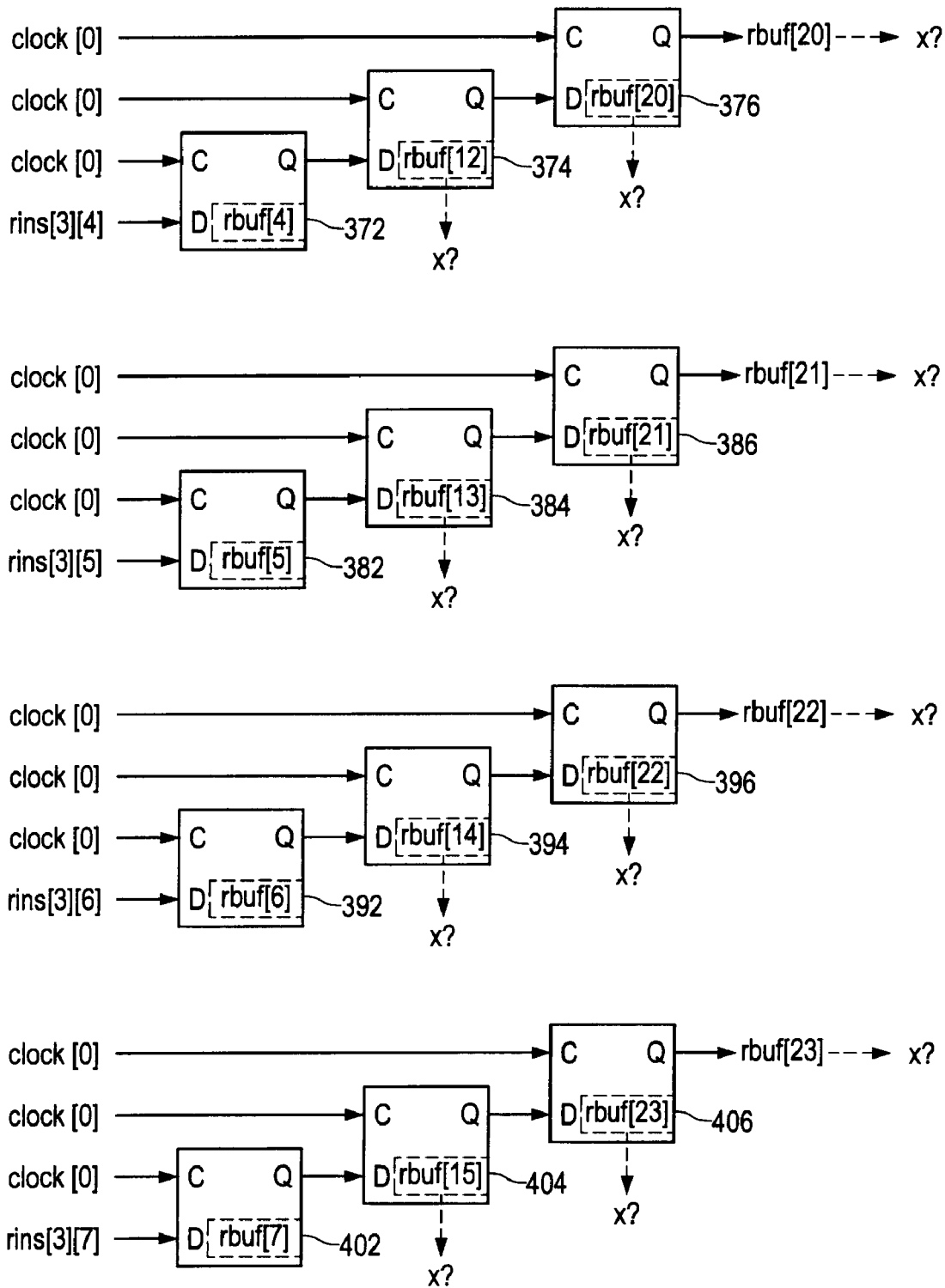
FIG. 8 shows an exemplary functional configuration of a sampling bit string generation unit according to the embodiment.

First, FIG. 7 and FIG. 8 are referenced. FIG. 7 and FIG. 8 show one example of a circuit configuration arranged on the sampling bit string generation unit 204 in order to realize a function for generating the sampling bit string rbuf having a length corresponding to three cycles of the carrier wave frequency.

The sampling bit string generation unit 204 has a shift register constituted by D flip-flops 332, 334 and 336 for generating the sampling bits rbuf [k] (k=0, 8, 16) corresponding to the sampling bit rins [3][0]. Similarly, the sampling bit string generation unit 204 has a shift register constituted by D flip-flops 342, 344 and 346 for generating the sampling bits rbuf [k] (k=1, 9, 17) corresponding to the sampling bit rins [3][1].

The sampling bit string generation unit 204 has a shift register constituted by D flip-flops 352, 354 and 356 for generating the sampling bits rbuf [k] (k=2, 10, 18) corresponding to the sampling bit rins [3][2]. The sampling bit string generation unit 204 has a shift register constituted by D flip-flops 362, 364 and 366 for generating the sampling bits rbuf [k] (k=3, 11, 19) corresponding to the sampling bit rins [3][3].

The sampling bit string generation unit 204 has a shift register constituted by D flip-flops 372, 374 and 376 for generating the sampling bits rbuf [k] (k=4, 12, 20) corresponding to the sampling bit rins [3][4]. The sampling bit string generation unit 204 has a shift register constituted by D flip-flops 382, 384 and 386 for generating the sampling bits rbuf [k] (k=5, 13, 21) corresponding to the sampling bit rins [3][5].

The sampling bit string generation unit 204 has a shift register constituted by D flip-flops 392, 394 and 396 for generating the sampling bits rbuf [k] (k=6, 14, 22) corresponding to the sampling bit rins [3][6]. The sampling bit string generation unit 204 has a shift register constituted by D flip-flops 402, 404 and 406 for generating the sampling bits rbuf [k] (k=7, 15, 23) corresponding to the sampling bit rins [3][7].

As described above, the sampling bit string generation unit 204 is constituted by the eight shift registers. However, in contrast to the group of shift registers shown in FIG. 4 and FIG. 5, the sampling clock [0] is input to any of the registers of the sampling bit string generation unit 204. Therefore, each shift register outputs the sampling bit rbuf [k] (k=0 to 23) that is shifted in synchronization with the sampling clock [0].

(Generation of Sampling Bits Corresponding to Rins[3][0])

First, the functions of the shift register constituted by the D flip-flops 332, 334, 336 and 338 will be described with reference to FIG. 7.

(Processing S5 of Intermediate Register)

The sampling bit rbuf [3][0] is input to a D terminal of the D flip-flop 332. The sampling clock [0] is input to a C terminal of the D flip-flop 332. The D flip-flop 332 samples a portion of the sampling bit rbuf [3][0] input to the D terminal at the time of the leading edge of the sampling clock [0] input to the C terminal, thus generating logic data rbuf [0]. The logic data rbuf [0] obtained by the sampling is output from the Q terminal of the D flip-flop 332.

(Processing S6 of Intermediate Register)

The logic data rbuf [0] output from the Q terminal of the D flip-flop 332 is input to a D terminal of the D flip-flop 334. The sampling clock [0] is input to a C terminal of the D flip-flop 334. The D flip-flop 334 samples a portion of the logic data rbuf [0] input to the D terminal at the time of the leading edge of the sampling clock [0] input to the C terminal, thus generating logic data rbuf [8]. The logic data rbuf [8] obtained by the sampling is output from the Q terminal of the D flip-flop 334.

(Processing S7 of Intermediate Register)

The logic data rbuf [8] output from the Q terminal of the D flip-flop 334 is input to a D terminal of the D flip-flop 336. The sampling clock [0] is input to a C terminal of the D flip-flop 336. The D flip-flop 336 samples a portion of the logic data rbuf [8] input to the D terminal at the time of the leading edge of the sampling clock [0] input to the C terminal, thus generating logic data rbuf[16]. The logic data rbuf[16] obtained by the sampling is output from the Q terminal of the D flip-flop 336.

(Generation of Sampling Bits Corresponding to Rins [3][k] (k=1 to 7))

Subsequently, a method will be briefly described that uses the input of the sampling bits rins [3][k](k=1 to 7) to provide the samplings bit rbuf [m](m=1 to 7, 9 to 15, 17 to 23) shifted in synchronization with the sampling clock [0].

A circuit configuration of the sampling bit string generation unit 204 for providing the sampling bits rbuf[m](m=1 to 7, 9 to 15, 17 to 23) is substantially the same as the above exemplary circuit configuration for using the input of the sampling bit rins [3][0] to output rbuf [m] (m=0, 8, 16) except for a combination of the input sampling bits rins [3][k] and the output sampling bits rbuf [m]. In the below explanation, only the combination of the sampling bits rins [3][k] input to the registers and the output sampling bits rbuf [m] is briefly described, and the detailed circuit configuration is omitted.

As shown in FIG. 7, when the sampling bit rins [3][1] is input to the shift register constituted by the D flip-flops 342, 344 and 346, the sampling bits rbuf [1], rbuf [9] and rbuf [17] are output. When the sampling bit rins [3][2] is input to the shift register constituted by the D flip-flops 352, 354 and 356, the sampling bits rbuf [2], rbuf [10] and rbuf [18] are output. When the sampling bit rins [3][3] is input to the shift register constituted by the D flip-flops 362, 364 and 366, the samplings bit rbuf [3], rbuf [11] and rbuf [19] are output.

As shown in FIG. 8, when the sampling bit rins [3][4] is input to the shift register constituted by the D flip-flops 372, 374 and 376, the sampling bit rbuf [4], rbuf [12] and rbuf [20] are output. When the sampling bit rins [3][5] is input to the shift register constituted by the D flip-flops 382, 384 and 386, the sampling bit rbuf [5], rbuf [13] and rbuf [21] are output. When the sampling bit rins [3][6] is input to the shift register constituted by the D flip-flops 392, 394 and 396, the sampling bit rbuf [6], rbuf [14] and rbuf [22] are output.

When the sampling bit rins [3][7] is input to the shift register constituted by the D flip-flops 402, 404 and 406, the sampling bit rbuf [7], rbuf [15] and rbuf [23] are output. As described above, the three cycles of the sampling bit string rbuf [m] (m=0 to 23) are generated from the sampling bit string rins [3][k], corresponding to one cycle of the carrier wave, generated using the sampling clocks [k] (k=0 to 7) having phased different from each other. The sampling bit string rbuf thus generated are input to the bit string extraction unit 206.

(Summary of Circuit Configuration)

Figure 9:
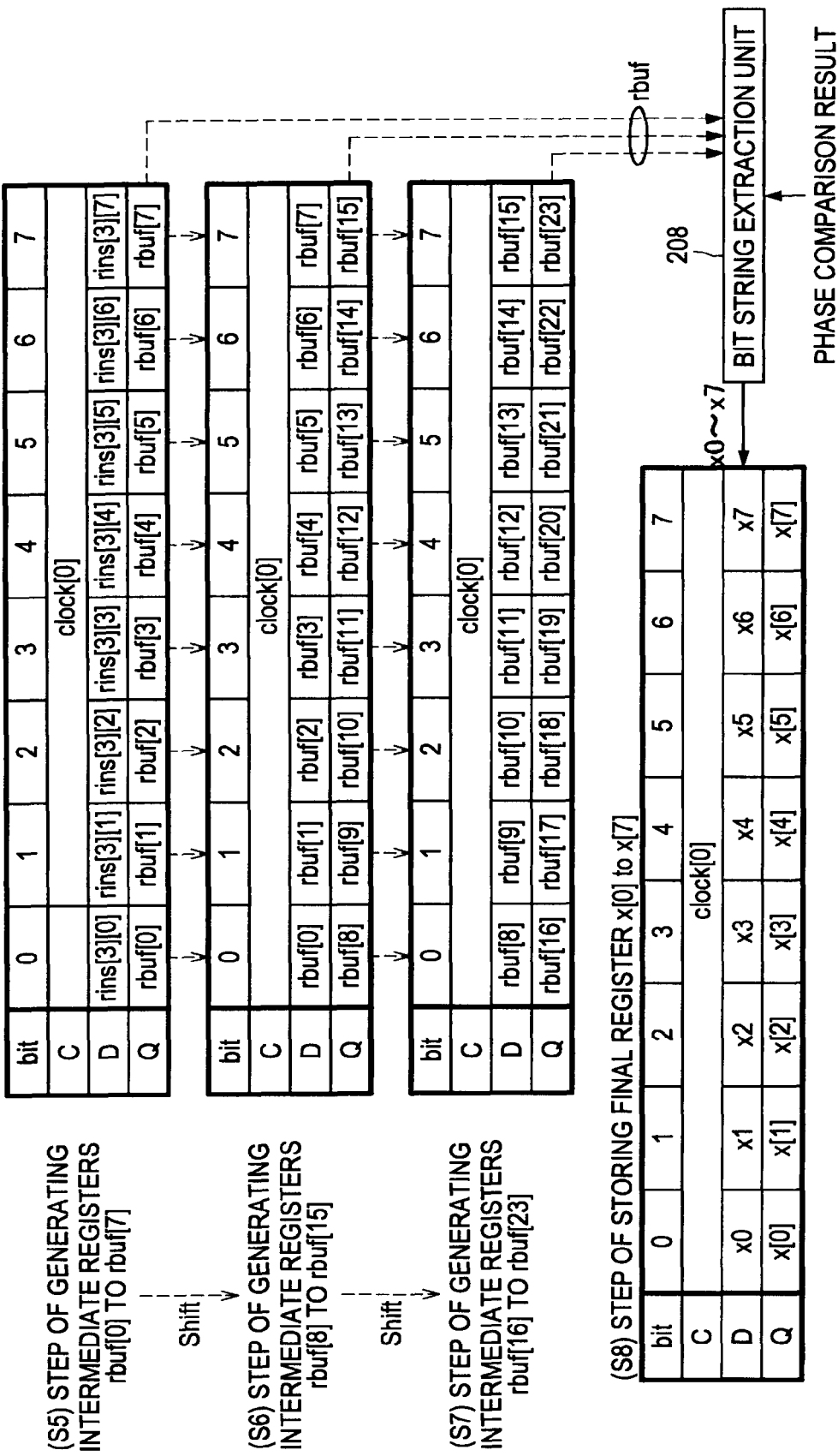
FIG. 9 shows a method for generating a sampling bit string according to the embodiment.

The portion of the circuit configuration of the sampling bit string generation unit 204 has been described hereinabove with reference to FIG. 7 and FIG. 8. As described above, the sampling bits rins [3][k] (k=0 to 7) are shifted in synchronization with the sampling clock [0], so that the sampling bit string rins [3] for one cycle of the carrier wave can be expanded into the sampling bit string for three cycles. FIG. 9 shows a summary of the sampling bits rins [3][k] input to the shift registers and the sampling bits rbuf [m] output from the shift registers. FIG. 9 is an explanatory diagram showing a method for generating the sampling bit string (of three cycles).

As shown in FIG. 9, firstly, the sampling bits rins [3][k] different in each bit are input to the register of the fifth stage. In the register of the fifth stage, the sampling bits rins [3][k] is shifted with the sampling clock [0], and the shifted logic data rbuf [m] (m=0 to 7) are output (S5). Subsequently, the sampling clock [0] and the logic data rbuf [m] output from the register at the fifth stage are input to the register at the sixth stage, and are shifted in synchronization with the sampling clock [0]. Then, the logic data rbuf [n] (n=8 to 15) obtained by shifting the logic data rbuf [m] (m=0 to 7) are output (S6).

Subsequently, the sampling clock [0] and the logic data rbuf [n] (n=8 to 15) output from the register at the sixth stage are input to the register at the seventh stage, and are shifted in synchronization with the sampling clock [0]. Then, the logic data rbuf [q] (q=16 to 23) obtained by shifting the logic data rbuf [n] (n=8 to 15) are output (S7). As a result of the above-described method, the sampling data rbuf corresponding to three cycles of the carrier wave are generated. Then, the sampling bits rbuf [k] (k=0 to 23) generated in steps S5, S6 and S7 are input to the bit string extraction unit 206.

(Bit String Extraction Unit 206)

FIG. 2 is referenced again. As described above, the sampling bit string generated by the sampling bit string generation unit 204 are input to the bit string extraction unit 206. For example, the sampling bit string corresponding to three cycles of the carrier wave are input as the sampling bit string to the bit string extraction unit 206. In the below explanation, for the sake of explanation, the 24-bit sampling bit string rbuf shown in FIG. 9 is assumed to be input to the bit string extraction unit 206.

When the 24-bit sampling bit string is input to the bit string extraction unit 206 from the sampling bit string generation unit 204, the bit string extraction unit 206 extracts successive 8-bit data x from the received sampling bit string. At this moment, the bit string extraction unit 206 determines an address (hereinafter referred to as LSB address) for identifying an LSB (Least Significant Bit) of the data x. It should be noted that the LSB address of the data x is represented by 4 higher order bits of phase error data described later.

First, the bit string extraction unit 206 extracts the 8-bit data x starting from the predetermined address from the sampling bit string rbuf. For example, the bit string extraction unit 206 extracts successive 8-bit sampling bit string rbuf [0], . . . , rbuf [7] as data x0, . . . , x7, and stores the data x0, . . . , x7 as bit string x[0], . . . , x[7] to the register (see step S8 of FIG. 9). Further, the bit string extraction unit 206 inputs to the later-described detection/phase comparison unit 208 the bit string x[k] (k=0 to 7) extracted from the sampling bit string rbuf.

The detection/phase comparison unit 208 generates detected data (r_amp) and phase data (p_amp) based on the received bit string x, and generates phase error data (p_err) based on these data. The detected data (r_amp) includes soft-decision data representing a reliability of hard-decision data indicating a decision made based on a sign of a bit value. The phase data (p_amp) includes soft-decision data representing an amount of shift from the phase of the carrier wave. The phase error data represents a phase shift between the extracted bit string x and the carrier wave of the digital modulation signal. A method for driving the detected data, the phase data, and the phase error data will be described later. An LSB address (p_lpf) representing a correct extraction position of the bit string x is determined based on this phase error data, and is fed back as a phase comparison result to the bit string extraction unit 206 from the detection/phase comparison unit 208.

The bit string extraction unit 206 extracts 8-bit sampling bit string rbuf [k] (k=p_lpf, . . . , p_lpf+7) starting from the fed-back LSB address as data x0, . . . , x7, and stores the data x0, . . . , x7 as bit string x[0], . . . , x[7] to the register (see step S8 of FIG. 9). Further, the bit string extraction unit 206 inputs the bit string x[k] (k=0 to 7) extracted from the sampling bit string rbuf to the later-described detection/phase comparison unit 208.

(Detection/Phase Comparison Unit 208)

As described above, the detection/phase comparison unit 208 calculates the detected data r_amp and the phase data p_amp from the 8-bit bit string x input from the bit string extraction unit 206. The detected data r_amp is given by, for example, the below Expression (1). The phase data p_amp is given by, for example, the below Expression (2). In other words, the detected data r_amp and the phase data p_amp are calculated by adding predetermined weights to the bit values of the bit string x.

[Expression 1]

$$r\_amp = x[0] + x[1] + x[2] + x[3] - x[4] - x[5] - x[6] - x[7] \quad (1)$$

$$p\_amp = x[0] + x[1] - x[2] - x[3] - x[4] - x[5] + x[6] + x[7] \quad (2)$$

Alternatively, the detected data r_amp may be obtained from the below Expression (3) in which the weights are changed.

[Expression 2]

$$r\_amp = x[0] + 2*x[1] + 2*x[2] + x[3] - x[4] - 2*x[5] - 2*x[6] - x[7] \quad (3)$$

The sign of the above phase data p_amp is reversed when the sign of the detected data r_amp is negative. Accordingly, based on the below Expression (4), the detection/phase comparison unit 208 calculates the phase error data p_err by reversing the sign of the phase data p_amp in accordance with the sign of the detected data r_amp. In the below Expression (4), an operational expression "X=A?B:C" means "where the condition A is true, X=B is assigned, and where the condition A is false, X=C is assigned." This operation for reversing the sign enables providing correct phase data even when a random series is given.

[Expression 3]

$$p\_err = r\_amp < 0 ? p\_amp : -p\_amp \quad (4)$$

After the phase error data p_err is given by the above Expression (4), the detection/phase comparison unit 208 uses the phase error data p_err to calculate the LSB address p_lpf for extracting the correct bit string x, based on the below Expression (5). This LSB address p_lpf corresponds to the start address from which the bit string x is extracted from the sampling bit string rbuf. In other words, the sampling bit string rbuf is subjected to a low pass filter based on the LSB address p_lpf as shown in the below Expression (6). In the below Expression (6), a left side of an arrow represents a condition, and a right side of an arrow represents an extracted range of the sampling bit string rbuf.

[Expression 4]

$$p\_lpf = p\_lpf + p\_err \quad (5)$$

p_lpf=0→rbuf[0] to rbuf[7], p_lpf=1→rbuf[1] to rbuf[8], p_lpf=2→rbuf[2] to rbuf[9], p_lpf=3→rbuf[3] to rbuf[10], p_lpf=4→rbuf[4] to rbuf[11], p_lpf=5→rbuf[5] to rbuf[12], p_lpf=6→rbuf[6] to rbuf[13], p_lpf=7→rbuf[7] to rbuf[14], p_lpf=8→rbuf[8] to rbuf[15], p_lpf=9→rbuf[9] to rbuf[16], p_lpf=10→rbuf[10] to rbuf[17], p_lpf=11→rbuf[11] to rbuf[18], p_lpf=12→rbuf[12] to rbuf[19], p_lpf=13→rbuf[13] to rbuf[20], p_lpf=14→rbuf[14] to rbuf[21], p_lpf=15→rbuf[15] to rbuf[22]  (6)

As described above, the detection/phase comparison unit 208 detects an offset of the phase based on the phase error data p_err, and determines the LSB address p_lpf of the sampling bit string rbuf closest to a position at which the phase of the carrier wave is zero. Then, the LSB address p_lpf determined by the detection/phase comparison unit 208 is fed back to the bit string extraction unit 206. As described above, the bit string extraction unit 206 extracts the sampling bit string rbuf based on the fed back LSB address p_lpf, and inputs the extracted sampling bit string rbuf to the detection/phase comparison unit 208. Then, the detection/phase comparison unit 208 uses the bit string x extracted by the bit string extraction unit 206 to calculate the detected data and the phase data, and outputs the detected data and the phase data to data determination processing means arranged at a stage subsequent to the signal processing apparatus 200. Then, the data determination processing means demodulates the original data.

The configuration of the signal processing apparatus 200 according to the present embodiment has been hereinabove described in detail. The above configuration provides a simpler circuit configuration than the signal processing apparatus 100 according to the fundamental technology, and reduces the power consumption because the signal processing apparatus 200 does not have any logic circuit operating at a non-selected sampling clock.

[2-2: Flow of Processings Performed by Signal Processing Apparatus 200]

Figure 10:
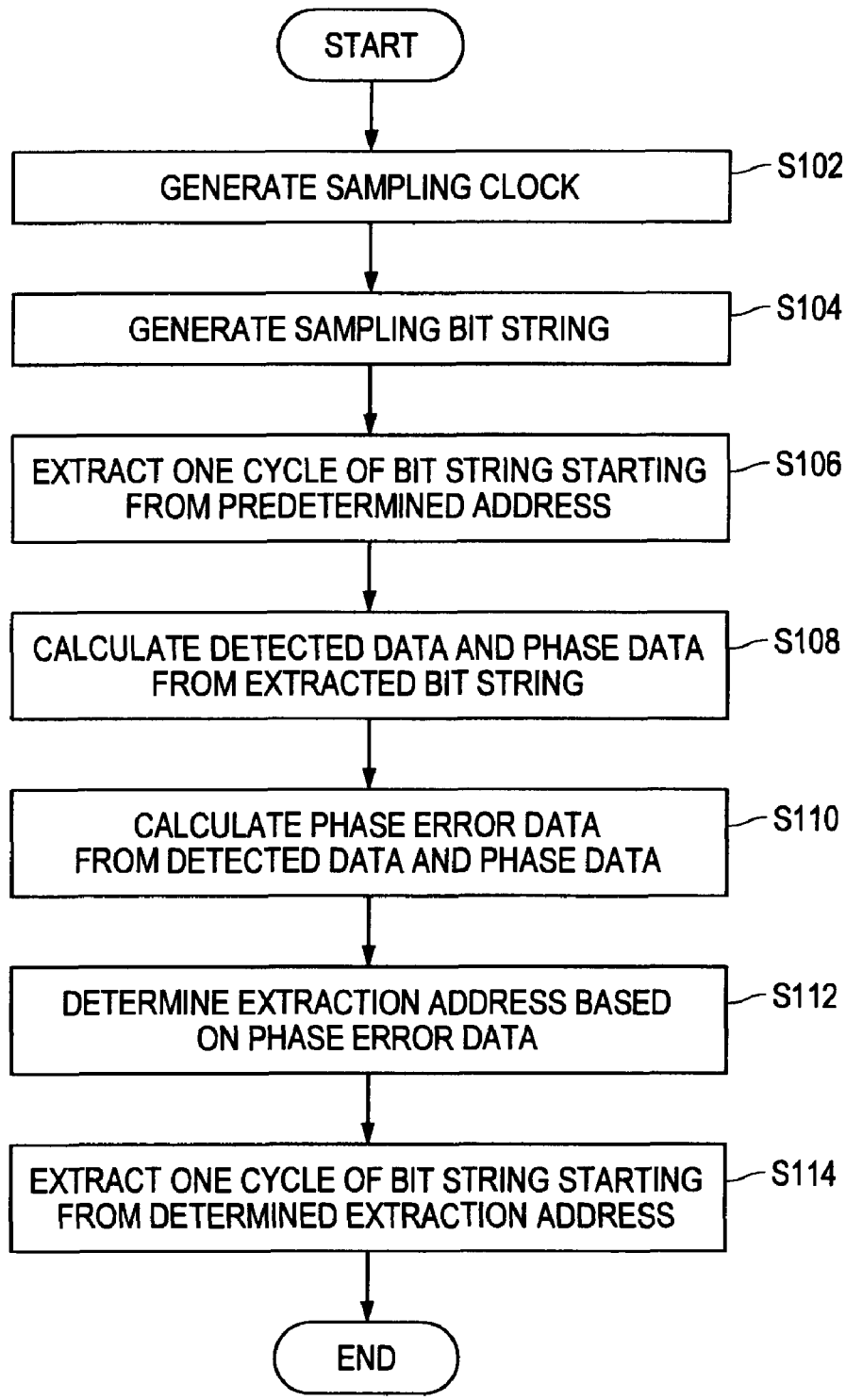
FIG. 10 shows a flow of detection processing according to the embodiment.

The flow of processings performed by the signal processing apparatus 200 according to the present embodiment will be briefly summarized with reference to FIG. 10. FIG. 10 is an explanatory diagram showing the flow of processings performed by the signal processing apparatus 200 according to the present embodiment.

As shown in FIG. 10, firstly, the sampling clock generation unit 202 generates a plurality of sampling clocks having the same frequency as the carrier wave but having different phases from each other (S102). Then, the plurality of sampling clocks are input from the sampling clock generation unit 202 to the sampling bit string generation unit 204. Subsequently, the sampling bit string generation unit 204 generates the sampling bit string (rbuf) having a length equal to or more than one cycle of the carrier wave (S104). Then, the sampling bit string (rbuf) is input from the sampling bit string generation unit 204 to the bit string extraction unit 206.

Subsequently, the bit string extraction unit 206 extracts the bit string (x) for one cycle from the sampling bit string (rbuf) (S106). Then, the bit string (x) for one cycle is input from the bit string extraction unit 206 to the detection/phase comparison unit 208. Subsequently, the detection/phase comparison unit 208 calculates the detected data (r_amp) and the phase data (p_amp) from the extracted bit string (x) (S108). Then, the detection/phase comparison unit 208 calculates the phase error data (p_err) from the detected data (r_amp) and the phase data (p_amp) (S110).

Subsequently, the detection/phase comparison unit 208 determines the LSB address (p_lpf) for extracting the correct bit string x, based on the phase error data (p_err) (S112). Then, the detection/phase comparison unit 208 feeds the LSB address (p_lpf) back to the bit string extraction unit 206. Subsequently, the bit string extraction unit 206 extracts the bit string x for one cycle, based on the LSB address (p_lpf) fed back from the detection/phase comparison unit 208 (S114), and terminates the series of processings.

The detected data and the phase data can be easily generated by using the above-described method. When this method is used, the carrier wave and the sampling clock are locked at the same or the opposite phases. When the carrier wave and the sampling clock are locked at the same phase, correct data are detected. When the carrier wave and the sampling clock are locked at the opposite phases, reversed data are detected. Therefore, when the carrier wave and the sampling clock are locked at the opposite phases, the reliability of data is reduced in proximity to a point at which data are switched. In many cases, correct data can be obtained by reversing data when data are determined at a point other than around the point at which data are switched. Alternatively, whether data are reversed or not may be determined by referencing a synchronization code and the like, and when data are reversed, subsequent data may be reversed again to be brought back to the original, so that generally correct data can be obtained although the signal quality may deteriorate to some extent.

However, when Manchester Code is used, data are switched in each bit, which always causes anxiety about data. Therefore, when Manchester Code is used, some contrivance is required to avoid locking at the opposite phases. In view of the above circumstances, the inventors of the present application has exercised their ingenuity in the preamble, and invented a method for avoiding locking at the opposite phases.

(Solution 1: Method for Changing Method for Generating Phase Data at Preamble)

First of all, a method for changing a generation method of phase data upon a detection of a preamble can be considered as the first method for preventing data from being locked at the opposite phases (hereinafter referred to as solution 1). In this example, the data in the preamble portion are assumed to be fixed to zero. In other words in the preamble portion, data such as "0000000" is repeated in the cycle of the carrier wave.

In this case, before the preamble is detected, the phase data is configured to be p_lpf obtained by filtering p_amp. After the preamble is detected, the phase data is configured to be p_lpf obtained by filtering p_err. With such configuration, data are locked to zero before the preamble is detected. As a result, in the preamble, data are locked to a correct phase. After the preamble is detected, data are already locked to the correct phase. Therefore, even when input data attains one, data are maintained to be locked to the correct phase.

Figure 11:
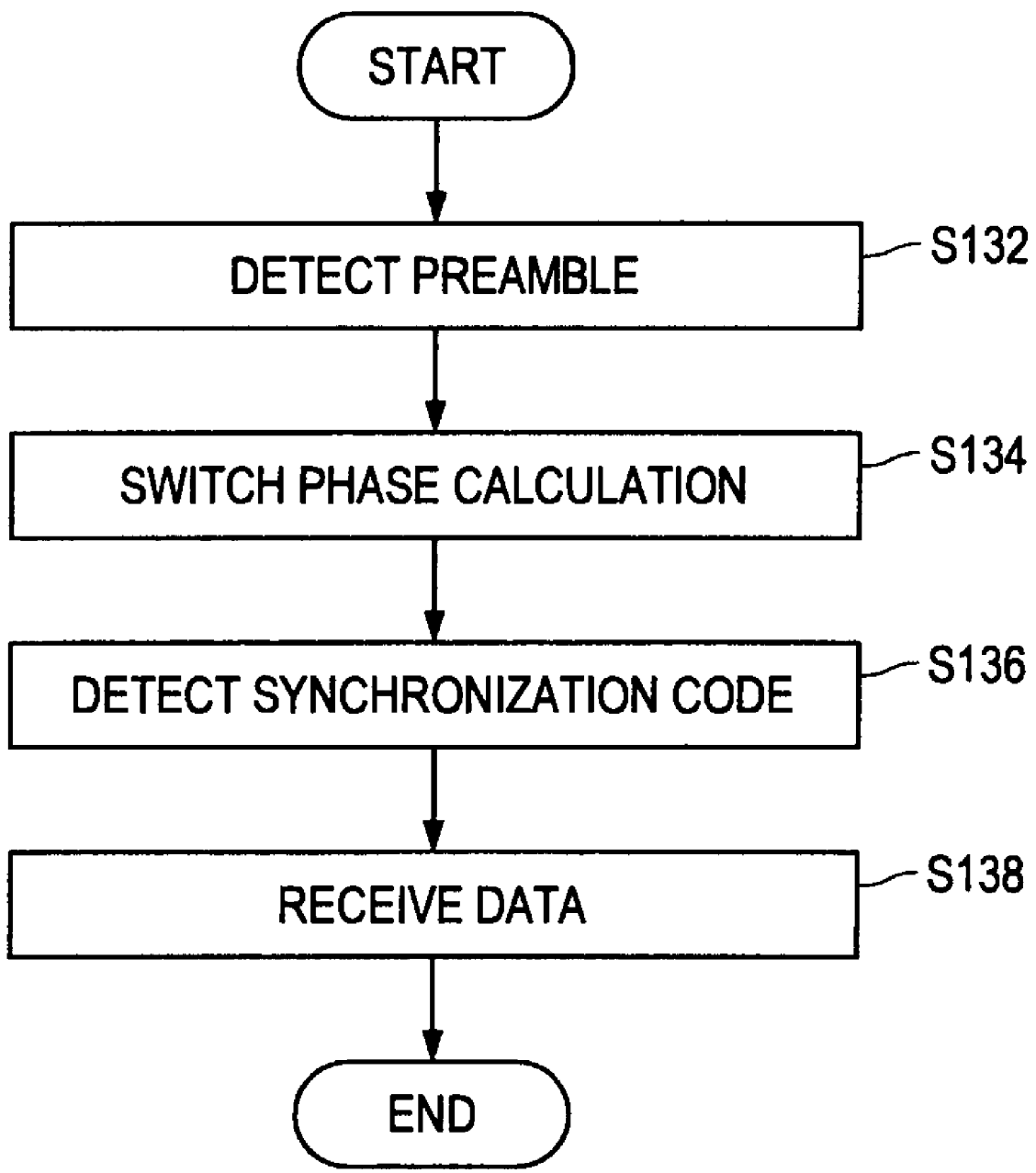
FIG. 11 shows a flow of detection processing according to the embodiment.

The flow of the above-described processings are briefly shown in FIG. 11. As shown in FIG. 11, when a preamble is detected (S132), a phase calculation (method for generating phase data) is switched (S134). Subsequently, a synchronization code is detected (S136), and data are received (S138). In other words, the solution 1 is characterized by the switching of the method for generating the phase data when the preamble is detected in step S132. An attention should be paid to the data of the preamble being fixed to a predetermined value.

(Solution 2: Method for Causing Many Changes of Data at Preamble)

Subsequently, a method for causing many changes of data at a preamble can be considered as the second method for preventing data from being locked at the opposite phases (hereinafter referred to as solution 2). In this method, data in the preamble portion are set to alternately switch between zero and one. For example, the data at the preamble portion are assumed to include data such as "01010101" repeated in the cycle of the carrier wave.

As described above, when data are detected while the data are locked at the opposite phases, the reliability in switching of the data deteriorates. At such point, the detected data r_amp is either zero or a value close to zero in absolute value. For example, where r_amp=0 is satisfied, the phase is clearly reversed. In such case, the phase error data p_err is set to a predetermined large value (p_max). For example, the phase error data p_err is determined based on the below Expression (7). For example, p_max=4 is set.

[Expression 5]

$$p\_err=(r\_amp=0)?p\_max:z,$$

$$z=(r\_amp<0)?p\_amp:-p\_amp \quad (7)$$

Figure 12:
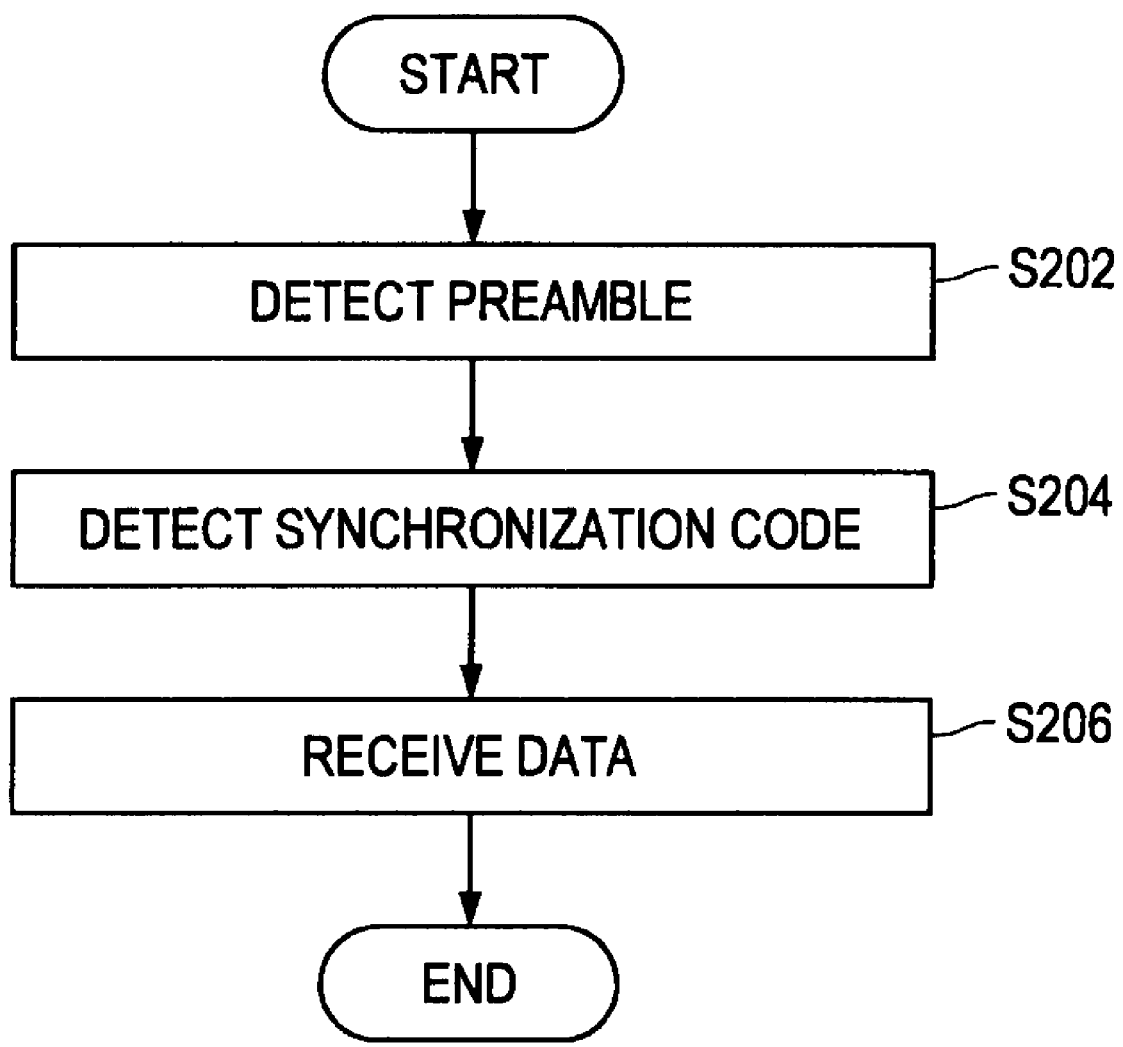
FIG. 12 shows a flow of detection processing according to the embodiment.

With the use of the above Expression (6) instead of the above Expression (4), even when data are locked at the opposite phases, the phase can be changed to a correct phase. As a result, it is possible to avoid the deterioration in the reliability caused at the point at which data are switched while the data are locked at the opposite phases. FIG. 12 shows the flow of processings, corresponding to FIG. 11, performed when the above-described method is used. As shown in FIG. 12, the preamble is detected (S202), a synchronization code is detected (S204), and data are received (S206). A significant difference from the flow of processings shown in FIG. 11 is the absence of the switching step in the method for generating the phase data.

(Summary of Solutions 1 and 2)

When the above-described solutions 1 and 2 are applied, data can be extracted in a correct phase as long as a frequency of a carrier wave is the same as a frequency of a sampling clock. However, in many cases, the frequency of the carrier wave is not completely the same as the frequency of the sampling clock. This accumulates an error between the phase of the carrier wave and the phase of the sampling lock, which disturbs proper operation. In particular, when a carry or borrow occurs in the phase of the sampling clock, a dropout or overlap occurs in detected data.

"Carry" occurring in the phase of the sampling clock means that p_lpf changes from 15 to 0 in the above example. "Borrow" occurring in the phase of the sampling clock means that p_lpf changes from 0 to 15 in the above example. In many cases, when a phase-shift keying signal is used, such dropout or overlap tends to occur at a point at which data switches s over. In view of the above circumstances, data may be determined at a time other than a point at which data switches over, so that although a signal quality may be reduced to some extent, a major impact can be avoided in many cases. However, in a case of Manchester Code, such dropout or overlap directly results in a dropout or overlap of data, which may cause an error. To deal with such problem, it is necessary to suppress an occurrence of a carry or borrow in the phase.

(Solution 3: Shift of Extraction Range)

Figure 13:
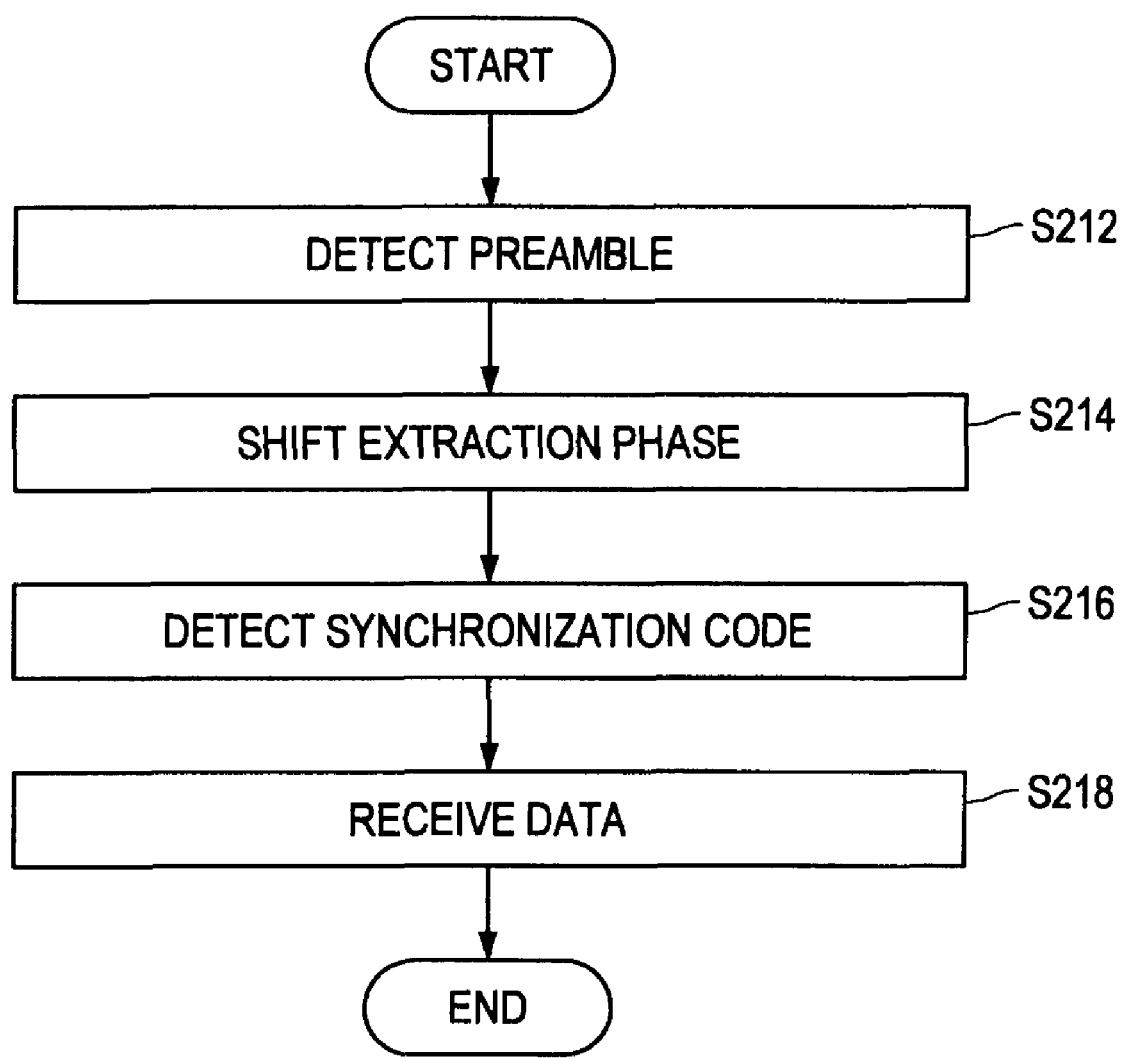
FIG. 13 shows a flow of detection processing according to the embodiment.

The inventors have invented a method for adjusting the extraction position of the bit string x upon detecting the preamble so that a carry or borrow does not occur in the phase of the sampling clock. In this method, when the extraction position of the bit string x is close to an end of the sampling bit string rbuf (for example, LSB addresses=0, 23), the extraction position is moved to near the center (for example, LSB address≈15). Hereinafter, this method will be described with reference to FIG. 13. FIG. 13 is an explanatory diagram showing a flow of data reception processing to which the above method is applied.

As shown in FIG. 13, firstly, a reception start flag is set. Then, the following processings are executed: a generation processing of the sampling bit string rbuf; an extraction processing of the bit string x; and a generation processing of the detected data and the phase data. Then, a detection processing for a preamble is executed (S212). Subsequently, an initialization processing of an extraction position (a shift processing of an extracted phase) is executed (S214). At this moment, when the extraction position of the bit string x in the detected preamble is determined to be close to an end of the sampling bit string rbuf, the detection/phase comparison unit 208 brings the extraction position of the bit string x close to the center. For example, the detection/phase comparison unit 208 shifts the LSB address p_lpf representing the extraction position of the bit string x, based on the below Expression (8).
[Expression 6]

$$p\_lpf<4 \rightarrow p\_lpf=p\_lpf+8,$$

$$p\_lpf>11 \rightarrow p\_lpf=p\_lpf-8 \qquad (8)$$

The above expression (8) is a conditional expression applied when the 8-bit bit string x is extracted from the 24-bit sampling bit string rbuf shown in the above example. For example, where a condition p_lpf<4 is satisfied, a further reduction of the LSB address p_lpf immediately causes a borrow, which causes an overlap of data. In view of the above circumstances, where the condition p_lpf<4 is satisfied, a better stability can be achieved by adjusting the LSB address p_lpf to a larger value. Similarly, where a condition p_lpf>11 is satisfied, a further increase of the LSB address p_lpf immediately causes a carry, which causes a dropout of data. In view of the above circumstances, where the condition p_lpf>11 is satisfied, a better stability can be achieved by adjusting the LSB address p_lpf to a smaller value.

The LSB address p_lpf is adjusted as shown in the Expression (8), so that the extraction position can be changed without changing the phase. As a result of this adjustment, the LSB address p_lpf always stays between 4 to 11, so that an occurrence of a carry or borrow can be suppressed without changing the phase. After the extraction phase is shifted in this way, a detection processing of a synchronization code (S216) and a reception processing of data (S218) are successively executed, and then, the series of processings are finished.

Even with the above method, when a packet length is made extremely long according to an embodiment, there is a possibility that an accumulated error between packets may cause a carry or borrow. When such a long packet is used, a length of sampling data is preferably configured to be long so as to avoid a carry or borrow of phase data that may be caused by an accumulated error at the maximum packet length. Alternatively, another effective method is inserting dummy signals for initializing the extraction position at a regular interval.

The flow of processings performed by the signal processing apparatus 200 according to the present embodiment has been described hereinabove. A method for dealing with problems, i.e., locking at the opposite phases and a carry or borrow occurring in the phase, arising from the use of the Manchester Code has been described hereinabove. The use of the above method achieves a better power saving feature, a simpler circuit configuration, and a more stable data detection, compared with the signal processing apparatus 100 according to the fundamental technology.

It should be understood by those skilled in the art that various modifications, combinations, sub-combinations and alterations may occur depending on design requirements and other factors insofar as they are within the scope of the appended claims or the equivalents thereof.

For example, the sampling bit string rbuf is assumed to be 24 bits in the above explanation about the embodiments, but may be changed to 16 bits, 32 bits, and the like as necessary, depending on embodiments.

The present application contains subject matter related to that disclosed in Japanese Priority Patent Application JP 2009-027768 filed in the Japan Patent Office on Feb. 9, 2009, the entire content of which is hereby incorporated by reference.

What is claimed is:

1. A signal processing apparatus comprising: a sampling clock generation unit for generating a sampling clock by delaying, by a predetermined amount, a phase of a driving clock having the same frequency as a carrier wave; a logic data generation unit for generating a plurality of logic data in synchronization with the driving clock, wherein the plurality of logic data are generated by using the predetermined driving clock generated by the sampling clock generation unit to sample a modulation signal obtained by shifting a phase of the carrier wave; a sampling bit string generation unit for generating a sampling bit string having a length longer than one cycle of the carrier wave by shifting the logic data generated by the logic data generation unit in accordance with the predetermined driving clock; a phase error data generation unit for using a bit string corresponding to one cycle of the carrier wave extracted from the sampling bit string generated by the sampling bit string generation unit to generate phase error data representing an amount of shift between a phase of the bit string and the phase of the carrier wave, wherein the phase error data generation unit includes: a detected data calculation unit for calculating soft-decision data, serving as detected data, obtained by adding a predetermined first weight to each bit value in the bit string, a phase data calculation unit for calculating soft-decision data, serving as phase data, obtained by adding a predetermined second weight to each bit value in the bit string, wherein the predetermined second weight is different from the predetermined first weight, and a phase error data calculation unit for calculating the phase error data, based on the detected data calculated by the detected data calculation unit and the phase data calculated by the phase data calculation unit; and an extraction position determination unit for determining, based on the phase error data generated by the phase error data generation unit, an extraction position of the bit string, corresponding to the one cycle, having a phase similar that of the carrier wave.

2. The signal processing apparatus according to claim 1, wherein the logic data generation unit samples an input signal in synchronization with a time of a leading edge of the sampling clock, and includes a plurality of registers for storing the logic data obtained by sampling until a time of a subsequent leading edge,
a register at a first stage receives a first sampling clock and the modulation signal, serving as the input signal,
a register at a Nth stage (N≧2) receives the first sampling clock or a sampling clock having a phase closer to that of the predetermined driving clock than the first sampling clock, and the register at the Nth stage (N≧2) further receives the logic data stored in a register at a (N−1)th stage, and the sampling bit string generation unit uses the logic data stored in a register at a final stage to generate a sampling bit string having a length longer than one cycle of the carrier wave.

3. The signal processing apparatus according to claim 1, wherein when the detected data calculated by the detected data calculation unit is negative, the phase error data calculation unit outputs, as the phase error data, data obtained by reversing the sign of the phase data calculated by the phase data calculation unit, and when the detected data is positive, the phase error data calculation unit outputs the phase data as the phase error data.

4. The signal processing apparatus according to claim 3, wherein a preamble of the modulation signal continuously includes same bit values, before the preamble is detected, the phase error data calculation unit outputs the phase data as the phase error data, and after the preamble is detected, the phase error data calculation unit outputs, as the phase error data, the phase data whose sign is reversed in accordance with the sign of the detected data.

5. The signal processing apparatus according to claim 3, wherein a preamble of the modulation signal alternately includes bit values different from each other, and when the detected data is close to zero, the phase error data calculation unit outputs a predetermined value E (E>>0) as the phase error data.

6. The signal processing apparatus according to claim 1, wherein when the extraction position of the bit string is close to a first bit or a last bit of the sampling bit string, the extraction position determination unit shifts the extraction position of the bit string to a position close to a central bit of the sampling bit string.

7. A signal processing method, comprising the steps of: generating a sampling clock by delaying, by a predetermined amount, a phase of a driving clock having the same frequency as a carrier wave; generating a plurality of logic data in synchronization with the driving clock, wherein the plurality of logic data are generated by using the predetermined driving clock generated by the sampling clock generating step to sample a modulation signal obtained by shifting a phase of the carrier wave; generating a sampling bit string having a length longer than one cycle of the carrier wave by shifting the logic data generated by the logic data generating step in accordance with the predetermined driving clock; using a bit string corresponding to one cycle of the carrier wave extracted from the sampling bit string generated by the sampling bit string generating step to generate phase error data representing an amount of shift between a phase of the bit string and the phase of the carrier wave, wherein generating phase error data includes: calculating soft-decision data, serving as detected data, obtained by adding a predetermined first weight to each bit value in the bit string, calculating soft-decision data, serving as phase data, obtained by adding a predetermined second weight to each bit value in the bit string, wherein the predetermined second weight is different from the predetermined first weight, and calculating the phase error data, based on the detected data and the phase data; and determining, based on the phase error data generated by the phase error data generating step, an extraction position of the bit string, corresponding to the one cycle, having a phase similar that of the carrier wave.

* * * * *